(12) United States Patent
Son et al.

(10) Patent No.: US 11,784,755 B2
(45) Date of Patent: *Oct. 10, 2023

(54) WIRELESS COMMUNICATION METHOD SUPPORTING MULTI-USER CASCADING TRANSMISSION AND WIRELESS COMMUNICATION TERMINAL USING SAME

(71) Applicants: WILUS INSTITUTE OF STANDARDS AND TECHNOLOGY INC., Gyeonggi-do (KR); SK TELECOM CO., LTD., Seoul (KR)

(72) Inventors: Juhyung Son, Gyeonggi-do (KR); Jinsam Kwak, Gyeonggi-do (KR); Geonjung Ko, Gyeonggi-do (KR); Woojin Ahn, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/567,078

(22) Filed: Dec. 31, 2021

(65) Prior Publication Data

US 2022/0123867 A1    Apr. 21, 2022

Related U.S. Application Data

(63) Continuation of application No. 16/851,101, filed on Apr. 17, 2020, now Pat. No. 11,258,543, which is a
(Continued)

(30) Foreign Application Priority Data

Apr. 11, 2016 (KR) .................. 10-2016-0044466
Apr. 12, 2016 (KR) .................. 10-2016-0045120

(51) Int. Cl.
*H04L 1/1607* (2023.01)
*H04W 84/12* (2009.01)
(Continued)

(52) U.S. Cl.
CPC .......... *H04L 1/1621* (2013.01); *H04L 1/0031* (2013.01); *H04L 1/1854* (2013.01);
(Continued)

(58) Field of Classification Search
CPC ..... H04L 1/1621; H04L 5/0053; H04W 84/12
See application file for complete search history.

(56) References Cited

U.S. PATENT DOCUMENTS 8,553,628 B2   10/2013   Jin et al.
10,230,497 B2   3/2019   Merlin et al.
(Continued)

FOREIGN PATENT DOCUMENTS

KR   10-2011-0095098   8/2011
WO   2016/003037      1/2016
(Continued)

OTHER PUBLICATIONS

Office Action dated Mar. 14, 2022 for Korean Patent Application No. 10-2022-7001337 and its English translation provided by Applicant's foreign counsel.
(Continued)

*Primary Examiner* — Abdullahi Ahmed
(74) *Attorney, Agent, or Firm* — Ladas & Parry, LLP

(57) ABSTRACT

Provided is a wireless communication terminal that communicates wirelessly. The terminal includes: a transceiver; and a processor. The processor is configured to receive a Downlink Multi-User (DL MU) PPDU including information for an Uplink Multi-User (UL MU) transmission from a base wireless communication terminal by using the transceiver, and transmit the UL MU PPDU to the base wireless
(Continued)

communication terminal based on the information for UL MU transmission.

12 Claims, 12 Drawing Sheets

Related U.S. Application Data continuation of application No. 16/153,670, filed on Oct. 5, 2018, now Pat. No. 10,659,196, which is a continuation of application No. PCT/KR2017/003932, filed on Apr. 11, 2017.

(51) Int. Cl.

| | |
|---|---|
| *H04L 5/00* | (2006.01) |
| *H04L 1/00* | (2006.01) |
| *H04L 1/1829* | (2023.01) |
| *H04L 69/22* | (2022.01) |
| *H04W 72/12* | (2023.01) |
| *H04L 1/06* | (2006.01) |
| *H04L 69/324* | (2022.01) |

(52) U.S. Cl.
CPC .......... *H04L 5/0023* (2013.01); *H04L 5/0053* (2013.01); *H04L 5/0055* (2013.01); *H04L 69/22* (2013.01); *H04W 84/12* (2013.01); *H04L 1/0003* (2013.01); *H04L 1/0643* (2013.01); *H04L 1/1685* (2013.01); *H04L 69/324* (2013.01); *H04W 72/12* (2013.01)

(56) References Cited

U.S. PATENT DOCUMENTS

| | | | |
|---|---|---|---|
| 10,659,196 B2 * | 5/2020 | Son | H04L 5/0055 |
| 11,258,543 B2 * | 2/2022 | Son | H04L 69/22 |
| 2015/0124690 A1 | 5/2015 | Merlin et al. | |
| 2016/0262173 A1 * | 9/2016 | Josiam | H04W 72/569 |
| 2016/0330714 A1 * | 11/2016 | Hedayat | H04L 5/0055 |
| 2017/0070267 A1 | 3/2017 | Nabetani et al. | |
| 2017/0127404 A1 * | 5/2017 | Merlin | H04W 72/23 |
| 2017/0181187 A1 | 6/2017 | Asteijadhi et al. | |
| 2018/0062805 A1 | 3/2018 | Huang et al. | |
| 2018/0069678 A1 | 3/2018 | Kim et al. | |
| 2018/0212738 A1 * | 7/2018 | Chun | H04L 27/26 |
| 2018/0220456 A1 | 8/2018 | Kim et al. | |
| 2018/0302924 A1 | 10/2018 | Kim et al. | |
| 2018/0309858 A1 | 10/2018 | Yang et al. | |
| 2019/0052407 A1 | 2/2019 | Son et al. | |
| 2019/0334817 A1 | 10/2019 | Seok | |
| 2019/0364577 A1 | 11/2019 | Hedayat | |
| 2020/0153596 A1 | 5/2020 | Chun et al. | |
| 2020/0196308 A1 | 6/2020 | Tandai et al. | |
| 2020/0244402 A1 | 7/2020 | Son et al. | |
| 2021/0083739 A1 | 3/2021 | Seok | |

FOREIGN PATENT DOCUMENTS

| | | |
|---|---|---|
| WO | 2016/018066 | 2/2016 |
| WO | 2016/028125 | 2/2016 |
| WO | 2016/032258 | 3/2016 |
| WO | 2016/053024 | 4/2016 |
| WO | 2017/179901 | 10/2017 |

OTHER PUBLICATIONS

Notice of Allowance dated Oct. 14, 2022 for Korean Patent Application No. 10-2022-7001337 and its English translation provided by Applicant's foreign counsel.
Hearing Notice dated Dec. 1, 2022 for Indian Patent Application No. 201827038283.
International Search Report for PCT/KR2017/003932 dated Aug. 11, 2017 and its English translation from WIPO (now published as WO 2017/179901).
Written Opinion of the International Searching Authority for PCT/KR2017/003932 dated Aug. 11, 2017 and its English translation from WIPO (now published as WO 2017/179901).
International Preliminary Report on Patentability (Chapter I) dated Oct. 16, 2018 for PCT/KR2017/003932 and its English translation from WIPO (now published as WO 2017/179901).
Notice of Allowance dated Jan. 15, 2020 for U.S. Appl. No. 16/153,670 (now published as US 2019/0052407).
Corrected Notice of Allowance dated Mar. 13, 2020 for U.S. Appl. No. 16/153,670 (now published as US 2019/0052407).
Office Action for Korean Patent Application No. 10-2020-7019862 dated Mar. 17, 2021 and its English translation provided by Applicant's foreign counsel.
Robert Stacey, "Specification Framework for TGax", IEEE 802.11-15/0132r15, Wireless LANs, Mar. 17, 2016, pp. 1-49.
M. Ozdemir et al., "Enhancing MAC Performance with a Reverse Direction Protocol for High-Capacity Wireless LANs," IEEE VTC, Dec. 31, 2006, pp. 1-5.
Office Action for Korean Patent Application No. 10-2020-7019863 dated Mar. 17, 2021 and its English translation provided by Applicant's foreign counsel.
Office Action for Chinese Patent Application No. 201780022881.9 dated Mar. 26, 2021 and its English translation provided by Applicant's foreign counsel.
Reza Hedayat et al: "Uplink ACK and BA Multiplexing", IEEE 802.11-15/829r3, Jul. 31, 2015, pp. 1-20.
Office Action for U.S. Appl. No. 16/851,078 dated Apr. 23, 2021.
Office Action dated Aug. 27, 2021 for Korean Patent Application No. 10-2020-7019862 and its English translation provided by Applicant's foreign counsel.
Office Action dated Sep. 15, 2021 for Korean Patent Application No. 10-2020-7019863 and its English translation provided by Applicant's foreign counsel.
Notice of Allowance dated Oct. 6, 2021 for U.S. Appl. No. 16/851,101 (now published as U.S. 2020/0244402).
Final Office Action dated Jul. 9, 2021 for U.S. Appl. No. 16/851,101 (now published as U.S. 2020/0244402).
Office Action dated Jan. 4, 2021 for U.S. Appl. No. 16/851,101 (now published as U.S. 2020/0244402).
Office Action dated Apr. 10, 2023 for Korean Patent Application No. 10-2023-7001526 and its English translation provided by Applicant's foreign counsel.

* cited by examiner

| B5 | B6 | Meaning |
|---|---|---|
| 0 | 0 | Normal Ack or Implicit BAR<br>- QoS Data in A-MPDU: The addressed recipient returns a BA |
| 1 | 0 | No Ack |
| 0 | 1 | No Explicit Ack or Scheduled Ack under PSMP or Trigger based UL MU Ack<br>- If the DL PPDU is HE MU PPDU, the addressed recipient returns an Ack/BA in MU format as an immediate response to a DL MU PPDU. <u>If UL MU resource allocation info is not available, the recipient records MPDU receive status.</u> |
| 1 | 1 | BA |

WIRELESS COMMUNICATION METHOD SUPPORTING MULTI-USER CASCADING TRANSMISSION AND WIRELESS COMMUNICATION TERMINAL USING SAME

CROSS-REFERENCE TO RELATED APPLICATIONS

This application is a continuation of U.S. patent application Ser. No. 16/851,101 filed on Apr. 17, 2020, which is a continuation of U.S. patent application Ser. No. 16/153,670 filed on Oct. 5, 2018, issued as U.S. Pat. No. 10,659,196 on May 19, 2020, which is a continuation of International Patent Application No. PCT/KR2017/003932 filed on Apr. 11, 2017, which claims the priority to Korean Patent Application No. 10-2016-0044466 filed in the Korean Intellectual Property Office on Apr. 11, 2016, and Korean Patent Application No. 10-2016-0045120 filed in the Korean Intellectual Property Office on Apr. 12, 2016, the entire contents of which are incorporated herein by reference.

TECHNICAL FIELD

The present invention relates to a wireless communication method and a wireless communication terminal supporting multi-user cascading transmission

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel. Therefore, required is a technology capable of efficiently using bandwidths by simultaneously transmitting data between a plurality of terminals and base terminals.

DISCLOSURE

Technical Problem

An object of an embodiment of the present invention is to provide a wireless communication terminal supporting multi-user cascading transmission.

Technical Solution

According to an embodiment of the present invention, provided is a wireless communication terminal that wirelessly communicates. The wireless communication terminal includes: a transceiver; and a processor, wherein the processor is configured to receive a Downlink Multi-User (DL MU) PPDU including information for an Uplink Multi-User (UL MU) transmission from a base wireless communication terminal by using the transceiver, and transmit the UL MU PPDU to the base wireless communication terminal based on the information for UL MU transmission.

The information for UL MU transmission may be UL MU response information including transmission scheduling information of a UL MU PPDU including ACK, wherein the UL MU response information may be included in a MAC header.

The processor may be configured to set signaling information indicating whether Spatial Reuse (SR) transmission to the UL MU PPDU is allowed such that the SR transmission may not be allowed.

The processor may be configured to use a frequency bandwidth of the same size as a frequency bandwidth of the DL MU PPDU as a BW value of a transmission parameter TXVECTOR of the UL MU PPDU.

The processor may be configured to transmit the UL MU PPDU without using UL MU-Multi-Input Multi-Output (MIMO).

The processor may be configured to transmit the UL MU PPDU using a binary convolutional coding (BCC) code.

When transmitting the UL MU PPDU, the processor may be configured to transmit a packet extension field according to a length indicated by the base wireless communication terminal.

The processor may be configured to transmit the UL MU PPDU without carrier sensing.

Whether or not carrier sensing is required when the wireless communication terminal transmits the UL MU PPDU may be determined by a length of the UL MU PPDU transmission duration.

An Aggregate-MAC Protocol Data Unit (A-MPDU) including the UL MU response information may not include a trigger MPDU that triggers a wireless communication terminal whose UL MU response information indicates UL MU transmission.

The UL MU transmission information may be a trigger MAC Protocol Data Unit (MPDU) for triggering the UL MU transmission of the wireless communication terminal.

The Aggregate-MPDU (A-MPDU) including the trigger MPDU may include a Block ACK MPDU as a first MPDU and includes a trigger MPDU as a second MPDU.

The A-MPDU may include a Block ACK Request (BAR) MPDU as a last MPDU.

According to an embodiment of the present invention, provided is a wireless communication terminal that wirelessly communicates. The wireless communication terminal includes: a transceiver; and a processor, wherein the processor is configured to transmit a Downlink Multi-User (DL MU) PPDU including information for an Uplink Multi-User (UL MU) transmission to a plurality of wireless communication terminals by using the transceiver, and receive a UL MU PPDU transmitted based on the information for UL MU transmission from at least one of the plurality of wireless communication terminals.

The information for UL MU transmission may be UL MU response information including transmission scheduling information of a UL MU PPDU including ACK, wherein the UL MU response information may be included in a MAC header.

The processor may be configured to signal a request for an MU-Block ACK for at least one MPDU among a plurality of MPDUs included in the DL MU PPDU, and when an MU-Block ACK for at least one MPDU is not received, transmit a MU-Block Ack Request (BAR) frame.

The processor may be a trigger MAC Protocol Data Unit (MPDU) for triggering UL MU transmission of a wireless communication terminal, and an Aggregate-MPDU (A-MPDU) including the trigger MPDU may include the Block ACK MPDU as a first MPDU and includes the trigger MPDU as a second MPDU.

The A-MPDU may include a Block ACK Request (BAR) MPDU as a last MPDU.

According to an embodiment of the present invention, provided is an operation method of a wireless communication terminal that wirelessly communicates. The method includes: receiving, from a base wireless communication terminal, a Downlink Multi-User (DL MU) PPDU including information for Uplink Multi-User (UL MU) transmission; and transmitting the UL MU PPDU based on the information for UL MU transmission to the base wireless communication terminal.

The information for UL MU transmission may be UL MU response information including transmission scheduling information of a UL MU PPDU including ACK, wherein the UL MU response information may be included in a MAC header.

Advantageous Effects

An embodiment of the present invention provides a communication method supporting multi-user cascading transmission and a wireless communication terminal using the same.

DESCRIPTION OF DRAWINGS

FIG. 8 shows an Ack Policy indicated by a value of an Ack Policy field of a QoS Control field and the Ack Policy field according to an embodiment of the present invention.

MODE FOR CARRYING OUT THE INVENTION

Figure 1:
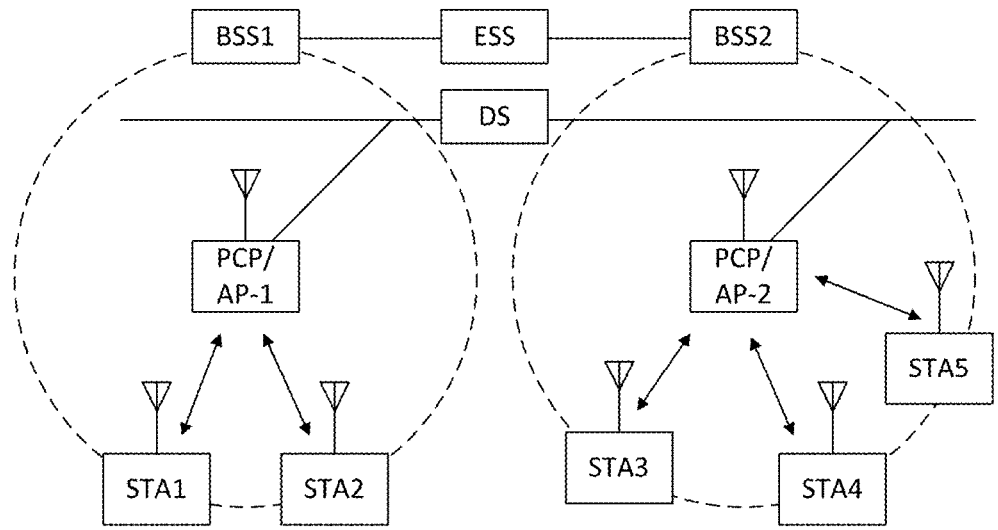
FIG. 1 shows a wireless LAN system according to an embodiment of the present invention.

Preferred embodiments of the present invention will be described below in more detail with reference to the accompanying drawings. The present invention may, however, be embodied in different forms and should not be construed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2016-0044466 (2016.04.11) and Nos. 10-2016-0045120 (2016.04.12) filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
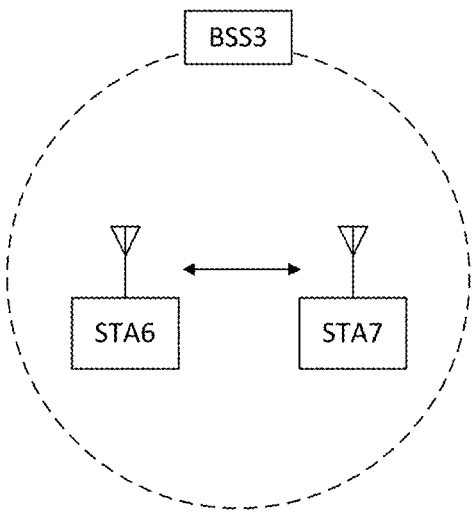
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
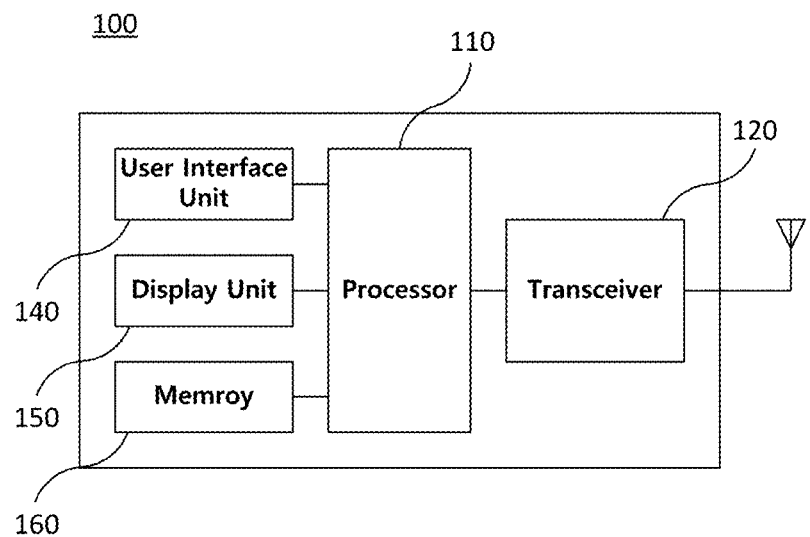
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
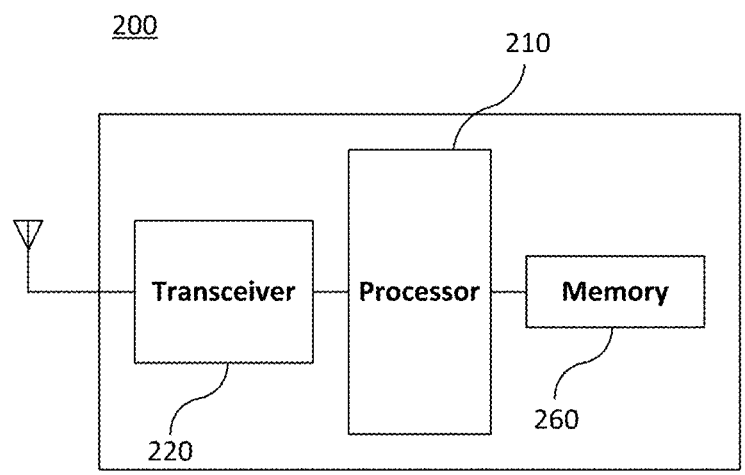
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
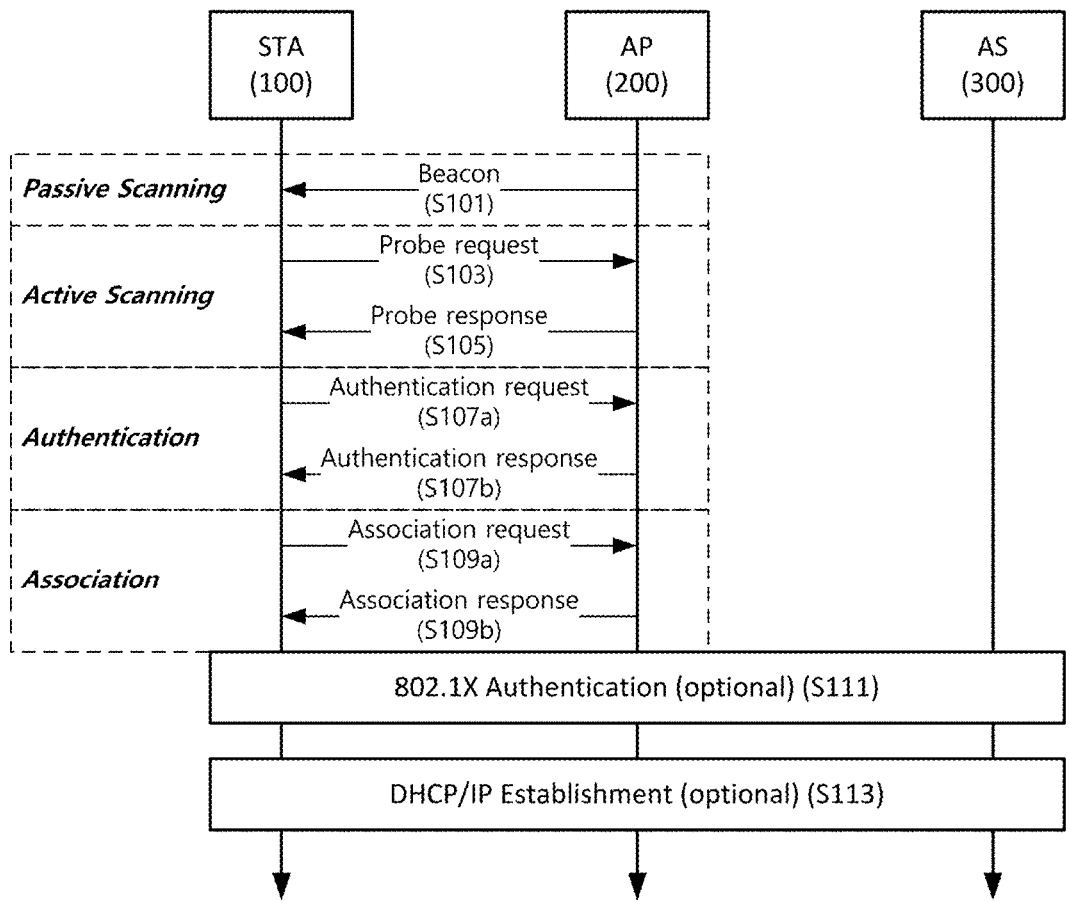
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP. The AP 200 may also be referred to as a base wireless communication terminal.

One Transmission Opportunity (TXOP) may include downlink (DL) transmission and uplink (UL) transmission. Specifically, a wireless communication terminal, which is an AP, performs DL transmission in one TXOP, and a non-AP wireless communication terminal may start UL transmission in succession to DL transmission. In addition, the non-AP wireless communication terminal performs UL transmission in one TXOP, and the wireless communication terminal, which is an AP, may start DL transmission in succession to UL transmission. One TXOP includes both DL transmission and UL transmission, and the continuity between DL transmission and UL transmission is referred to as cascading. The base wireless communication terminal may transmit information for UL MU transmission when transmitting the DL MU PPDU for cascading transmission. Specifically, the base wireless communication terminal may transmit a DL MU PPDU including an MPDU including UL MU response information. In this case, the UL MU response information may be information included in the MAC header. Specifically, the UL MU response information may be information for scheduling a trigger-based PPDU including an ACK. In a specific embodiment, the UL MU response information may be information for scheduling a trigger-based PPDU that includes an immediate ACK. In addition, the base wireless communication terminal may transmit the DL MU PPDU including the trigger MPDU. The trigger MPDU is an MPDU that triggers UL transmission of one or a plurality of wireless communication terminals. A plurality of wireless communication terminals may simultaneously transmit UL PPDU based on information for UL MU transmission. Specifically, a plurality of wireless communication terminals may transmit OFDMA UL PPDU based on UL MU transmission information. The information for UL MU transmission will be described in detail with reference to FIG. 6 to FIG. 7.

Figure 6:
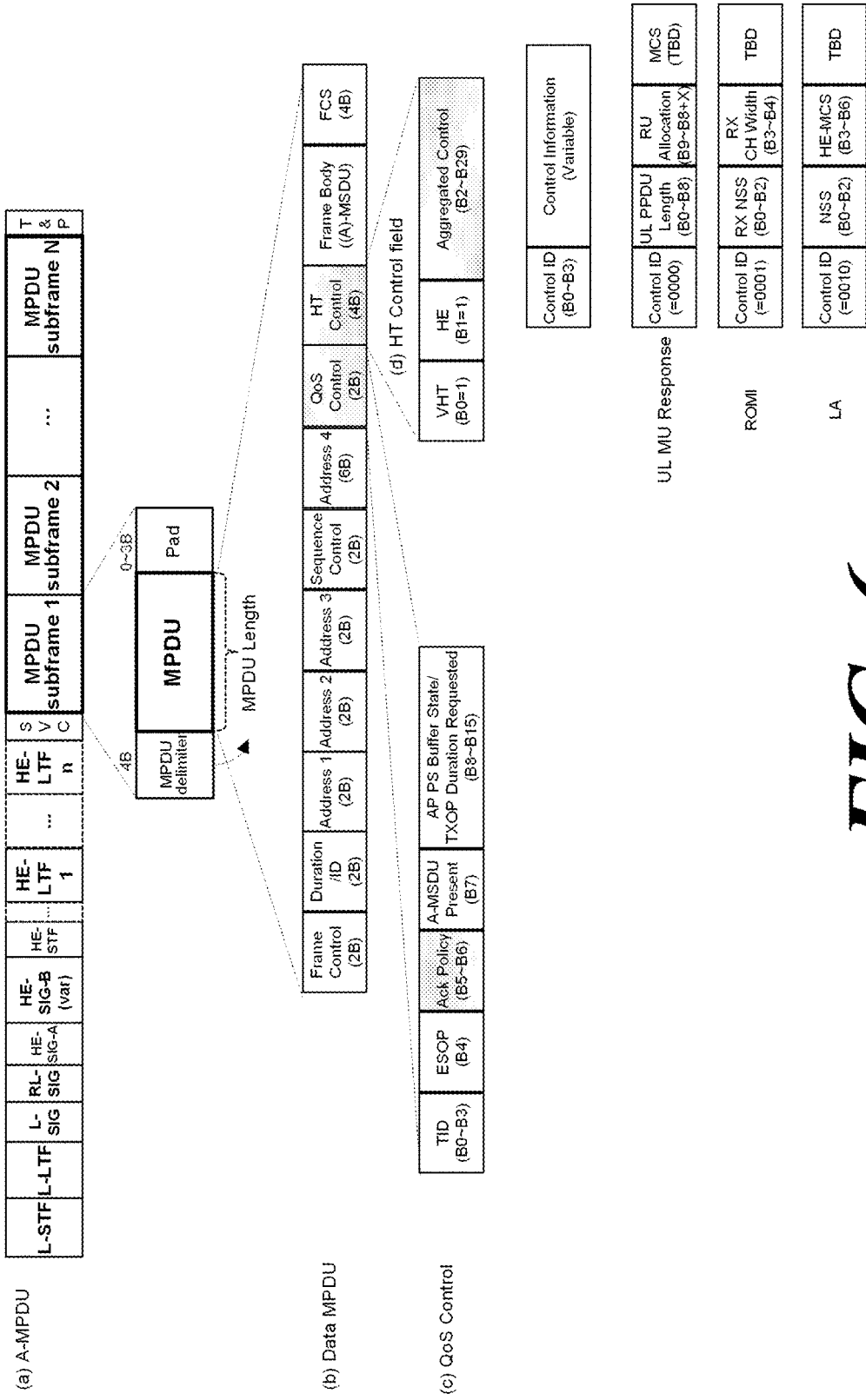
FIG. 6 shows a format of an A-MPDU used for DL transmission by a base wireless communication terminal according to an embodiment of the present invention.

FIG. 6 shows a format of an A-MPDU used for DL transmission by a base wireless communication terminal according to an embodiment of the present invention.

A physical layer protocol data unit (PPDU) may include a PHY preamble, a payload, and a tail and padding bits (T & P). The PHY preamble may include a plurality of fields. Specifically, the PHY preamble may include an L-LTF and an L-STF including a training signal for a legacy wireless communication terminal. In addition, the PHY preamble may include an L-SIG field including signaling information for a legacy wireless communication terminal. The PHY preamble may also include an RL-SIG field to support auto detection of the PPDU format. In addition, the PHY preamble may include an HE-SIG-A field including signaling information for a non-legacy wireless communication terminal. In addition, the PHY preamble may include an HE-SIG-B field including signaling information for a non-legacy wireless communication terminal. In addition, the PHY preamble may include an HE-LTF and an HE-STF including training signals for non-legacy wireless communication terminals. In addition, the PHY preamble may include a service field. Specifically, the format of the PPDU may be the same as that of the embodiment of FIG. 6(*a*).

A PPDU may include one or a plurality of MPDUs. The MPDU may include a Frame Control field including information on frame control. In addition, the MPDU may include a Duration/ID field which indicates an identifier of the MPDU or the TXOP duration set by the MPDU. Also, the MPDU may include at least one of an Address 1 field, an Address 2 field, an Address 3 field, and an Address 4 field indicating an address related to transmission and reception of the MPDU. In addition, the MPDU may include a Sequence Control field indicating information on the sequence. In addition, the MPDU field may include a QoS Control field for QoS control. In addition, the MPDU may include an HT Control field for High Throughput (HT) control. In addition, the MPDU may include a Frame Body field including an MSDU. Also, the MPDU may include an FCS field for determining whether the MPDU includes an error. Specifically, the format of the MPDU may be the same as that of the embodiment of FIG. 6(*b*).

The QoS Control field may include a TID field indicating a TID of data to which the QoS Control field is applied. In addition, the QoS Control field may include an EOSP field indicating the end of the current service period. The QoS Control field may include an ACK Policy field indicating an ACK transmission method to be transmitted by the terminal that has received the data to which the QoS field is applied. The value indicated by the ACK Policy field will be described in detail with reference to FIG. 8. In addition, the QoS Control field may include an A-MSDU Present field indicating the type of the A-MSDU. In addition, the QoS Control field may include an AP PS Buffer State field indicating a PS buffer state. Specifically, the format of the QoS Control field may be the same as that of the embodiment of FIG. 6(*c*).

The HT Control field may include a VHT field indicating whether the information indicated by the HT Control field is Very High Throughput (VHT) control information. In addition, the HT Control field may include a HE field indicating whether the information indicated by the HT Control field is HE control information. In addition, the HT Control field may include an Aggregated Control (A-Control) field including a plurality of subfields representing information on control.

A sub-field included in the A-Control field may include a Control ID field for identifying control information included in the sub-field and a Control Information field for indicating control information included in the sub-field. Specifically, the sub-field included in the A-Control field includes UL MU response information, which is information for an uplink (UL) MU PPDU response to a downlink (DL) multi-user (MU) PPDU. In this case, the value of the Control ID field may be 0. In a specific embodiment, the UL MU response information may be used in the DL SU PPDU. This will be described with reference to FIG. 12. In addition, the sub-field included in the A-Control field may include information on the change of the receiver operation mode. Specifically, the information on the receiver operation mode change may be the Receiver Operating Mode Indication (ROMI) of the operation mode to be changed. In this case, the value of the Control ID field may be 1. In addition, the sub-field included in the A-Control field may include information on link adaptation. In this case, the value of the Control ID field may be 2.

The base wireless communication terminal may perform MU cascading transmission with a plurality of wireless communication terminals that receive UL MU response information using UL MU response information. Specifically, the base wireless communication terminal may transmit UL MU response information through the A-Control field while transmitting data through the DL MU PPDU. A plurality of wireless communication terminals that have received the DL MU PPDU from the base wireless communication terminal may transmit the UL MU PPDU based on the UL MU response information. The base wireless communication terminal may be allowed to transmit UL MU response information to wireless communication terminals having Capabilities for supporting UL MU transmission based on UL MU response information. Also, the base wireless communication terminal may not be allowed to simultaneously transmit the trigger MPDU and the UL MU response information in a single PPDU to the same wireless communication terminal. This will be described with reference to FIG. 7.

Figure 7:
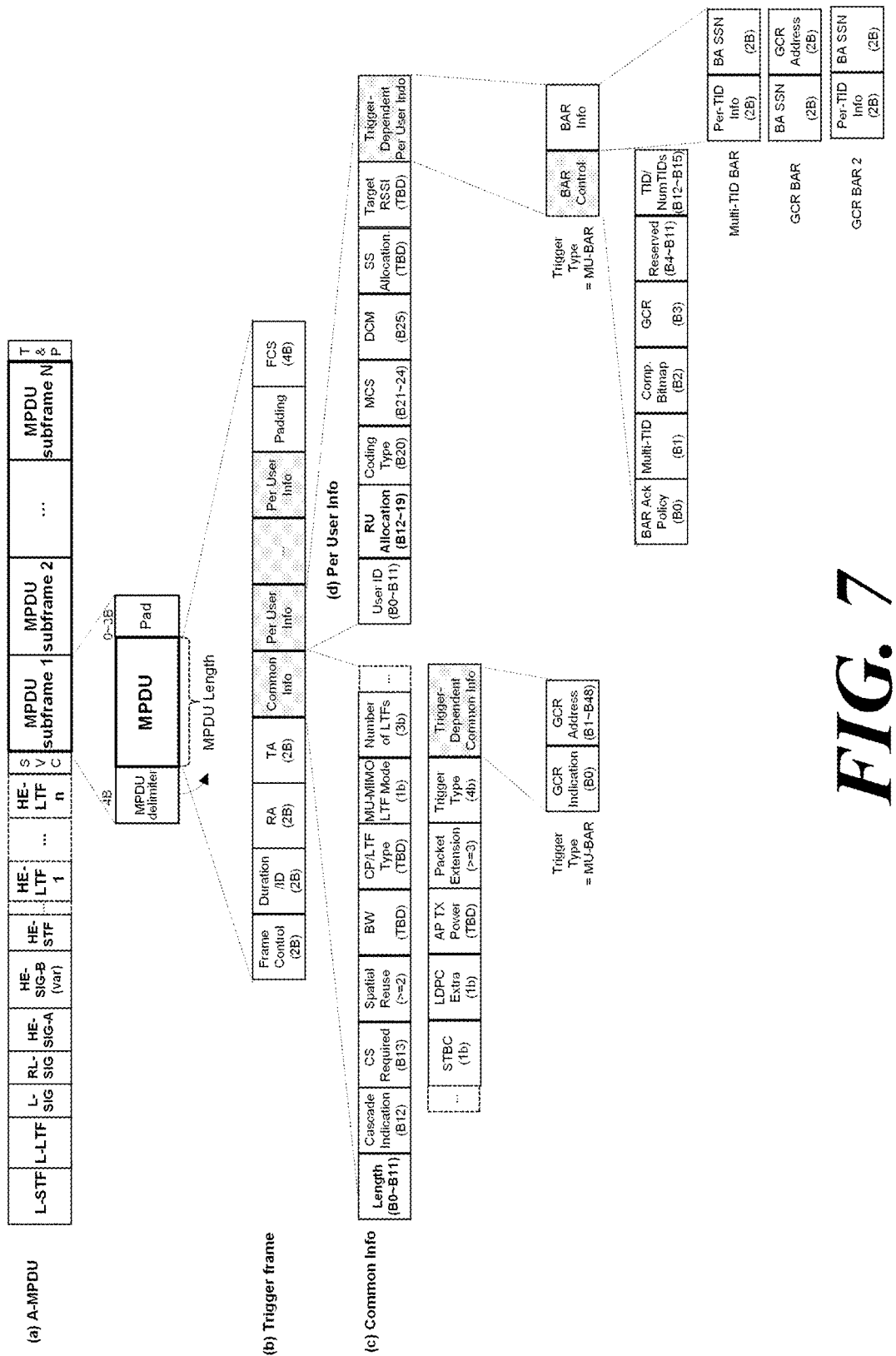
FIG. 7 shows a format of an A-MPDU used for DL transmission by a base wireless communication terminal according to another embodiment of the present invention.

FIG. 7 shows a format of an A-MPDU used for DL transmission by a base wireless communication terminal according to another embodiment of the present invention.

The base wireless communication terminal may transmit at least one of the control MPDU and the management MPDU together with the data MPDU through the A-MPDU. Therefore, the base wireless communication terminal may transmit the trigger MPDU among the control MPDU together with the data MPDU.

The trigger MPDU may include a Frame Control field including information on frame control. In addition, the trigger MPDU may include Duration/ID field which indicates an identifier of the MPDU or the TXOP duration set by the MPDU. In addition, the trigger MPDU may include an RA field indicating a receiver address of the trigger MPDU and a TA field indicating a transmitter address of the trigger MPDU.

Also, the trigger MPDU may include a Common Info field indicating information that is common to a plurality of wireless communication terminals receiving the trigger MPDU. In addition, the trigger MPDU may include a Per User Info field indicating information on each of a plurality of wireless communication terminals receiving the trigger MPDU. Also, the trigger MPDU may include padding for alignment upon transmission. Also, the trigger MPDU may include an FCS field for determining whether the MPDU includes an error. Specifically, the format of the trigger MPDU may be the same as that of the embodiment of FIG. 7(b).

The Common Info field may include a length field indicating the length of the UL MU PPDU transmitted based on the trigger MPDU. Specifically, the Length field may indicate the value of the L-SIG length field of the UL MU PPDU transmitted based on the trigger MPDU. Also, the Common Info field may include a Cascade Indication field indicating whether cascading transmission is performed in the TWT operation and the power save operation. In addition, the Common Info field may include a CS Required field indicating whether carrier sensing is required when the wireless communication terminal receiving the trigger MPDU transmits the UL MU PPDU based on the trigger MPDU. In addition, the Common Info field may include a Spatial Reuse field indicating information related to the SR operation of the UL MU PPDU transmitted based on the trigger MPDU. In addition, the Common Info field may include BW field information indicating the bandwidth of the HE SIG-A field of the UL MU PPDU transmitted based on the trigger MPDU. The BW field indicates the BW field value of the transmission parameter TXVECTOR of the UL MU PPDU. Specifically, the BW field may signal a value of one of 20, 40, 80, and 160 (80+80) MHz. In addition, the Common Info field may include a CP/LTF Type field indicating an LTF type of the UL MU PPDU transmitted based on the trigger MPDU. In addition, the Common Info field may include an MU-MIMO of the UL MU PPDU transmitted based on the trigger MPDU and an MU-MIMO LTF Mode field indicating the LTF mode. In addition, the Common Info field may include a Number of LTFs field indicating the number of LTF symbols of the UL MU PPDU transmitted based on the trigger MPDU. In addition, the Common Info field may include an STBC field indicating whether STBC encoding is applied to the UL MU PPDU transmitted based on the trigger MPDU. In addition, the Common Info field may include an LDPC Extra field indicating the status of the LDPC additional symbol segment in the UL MU PPDU transmitted based on the trigger MPDU. In addition, the Common Info field may include an AP TX Power field indicating the transmission power used for UL MU PPDU transmission transmitted based on the trigger MPDU. In this case, the AP TX Power field may indicate the transmission power in 20 MHz units. In addition, the Common Info field may include a Packet Extension field indicating a packet extension length of the UL MU PPDU transmitted based on the trigger MPDU. In addition, the Common Info field may include a Trigger Type field indicating the type of the trigger MPDU. In addition, the Common Info field may include a Trigger Dependent Common Info field which information varies depending on the type of the trigger MPDU.

If the type of the trigger MPDU indicated by the Trigger Type field is MU-BAR, the Trigger Dependent Common Info field may include information on Groupcast with retries (GCR). Specifically, the Trigger Dependent Common Info field may include a GCR Indication field indicating whether the MU-BAR is a GCR MU-BAR. In addition, the Trigger Dependent Common Info field may include a GCR Address field indicating a GCR address. The format of the concrete Common Info field may be the same as that of the embodiment of FIG. 7(c).

The Per User Info field may include a User ID field that identifies a wireless communication terminal corresponding to the Per User Info field. Also, the Per User Info field may include an RU Allocation field indicating information on a Resource Unit (RU) to be used by the wireless communication terminal corresponding to the Per User Info field in transmitting the UL MU PPDU. In addition, the Per User Info field may include a Coding Type indicating a coding type to be used when the wireless communication terminal corresponding to the Per User Info field transmits the UL MU PPDU. In addition, the Per User Info field may include an MCS field indicating information on a Modulation and Coding Scheme (MCS) to be used by the wireless communication terminal corresponding to the Per User Info field in transmitting the UL MU PPDU. In addition, the Per User Info field may include a DCM field indicating whether the wireless communication terminal corresponding to the Per User Info field uses the dual carrier modulation when transmitting the UL MU PPDU. In addition, the Per User Info field may include an SS Allocation field indicating information on a spatial stream used by the wireless communication terminal corresponding to the Per User Info field in transmitting the UL MU PPDU. Also, the Per User Info field may include a Target RSSI field indicating a target received signal strength, which is a signal strength at which the UL MU PPDU transmission signal transmitted by the wireless communication terminal corresponding to the Per User Info field is properly received. Also, the Per User Info field may include a Trigger Dependent Per User Info field including information according to the trigger type.

If the type of the trigger MPDU indicated by the Trigger Type field is MU-BAR, the Trigger Dependent Per User Info field may include a BAR Control field and a BAR Info field. The BAR Control field may include a BAR Ack Policy field indicating the ACK method designated for the MU-BAR. In addition, the BAR Control field may include a Multi-TID field indicating whether ACK transmission for multiple TIDs is requested. In addition, the BAR Control field may include a compressed Bitmap field indicating whether compressed bitmap-type Block ACK transmission is requested. In addition, the BAR Control field may include a GCR field indicating whether a GCR Block ACK transmission is requested. In addition, the BAR Control field may include a TID/Num TIDs field indicating information on a TID of data for which ACK transmission is requested. The information that the BA Info field represents depends on the BAR Control field. Specifically, when the value of the Multi-TID field of the BAR Control field is 1, the BAR Control field may request an ACK for a plurality of TIDs. In this case, the BAR Info field may include a Per TID Info field indicating a TID of data requesting an ACK and a BA SSN field indicating a first sequence number requesting an ACK through a Block ACK. Also, when the value of the GCR field is 1, the MU-BAR may request the GCR transmission. In this case, the BAR Info field may include a BA SSN field indicating a first sequence number requesting an ACK and a GCR Address field indicating a GCR address. In another specific embodiment, the BAR Info field may include a Per TID Info field indicating a TID of data requesting an ACK and a BA SSN field indicating a first sequence number requesting an ACK through a Block ACK. The Common Info field includes the GCR Address field to reduce unnecessary repetitive transmissions. The specific format of the Per User Info field may be as shown in FIG. 7(d).

FIG. 8 shows an Ack Policy indicated by a value of an Ack Policy field of a QoS Control field and the Ack Policy field according to an embodiment of the present invention.

The wireless communication terminal that has transmitted the data may request the wireless communication terminal that has received the data to transmit the ACK and designate the format of the ACK. The wireless communication terminal that has transmitted the data may request the ACK transmission to the wireless communication terminal that has received the data through the Ack Policy field of the QoS Control field of the MAC header and designate the format of the ACK. Specifically, the wireless communication terminal that has transmitted the data may request immediate transmission of an ACK frame or immediate transmission of a Block ACK frame to the wireless communication terminal that has received the data. In this case, the wireless communication terminal that has transmitted the data may set the value of the Ack Policy field of the QoS Control field to 0(00b). An immediate transmission request may be to request to transmit a response within a certain period of time from when the data was received or from when the request was received. In a specific embodiment, the time may be short inter-frame space (SIFS). In addition, the wireless communication terminal that has transmitted the data may request the wireless communication terminal that received the data to transmit the implied ACK or transmit the PSMP ACK. In this case, the wireless communication terminal that has transmitted the data may set the value of the Ack Policy field of the QoS Control field to 1(01 b). In addition, the wireless communication terminal may signal to the wireless communication terminal which has received the data that it does not request the transmission of the ACK. In this case, the wireless communication terminal that has transmitted the data may set the value of the Ack Policy field of the QoS Control field to 2(10b). In addition, the wireless communication terminal that has transmitted the data may signal to the wireless communication terminal that received the data that the wireless communication terminal that has transmitted the data will request the transmission of the Block ACK frame. In this case, the wireless communication terminal that has transmitted the data may set the value of the Ack Policy field of the QoS Control field to 3(11b). Also, the wireless communication terminal that has transmitted the data may request the wireless communication terminal that has received the data to transmit the MU ACK. In this case, the wireless communication terminal that has transmitted the data may set the value of the Ack Policy field of the QoS Control field to 1(01b).

In addition, the wireless communication terminal that has transmitted the data transmits the BAR frame to the wireless communication terminal that has received the data to request the immediate transmission of the Block ACK. In addition, the wireless communication terminal that has transmitted the data transmits the MU-BAR frame to the wireless communication terminal that has received the data to request the immediate transmission of the MU-Block ACK.

In the MU cascading transmission, the base wireless communication terminal may request immediate transmission of an MU-Block ACK frame for data transmission to the wireless communication terminal that has received the data. Specifically, the base wireless communication terminal may request immediate transmission of an MU-Block ACK for data transmission to a wireless communication terminal receiving data through an Ack Policy field of a QoS Control field or an MU-BAR frame. A method of setting an ACK policy field value in a cascading transmission and a method of transmitting/receiving a Block ACK frame will be described with reference to FIG. 9.

Figure 9:
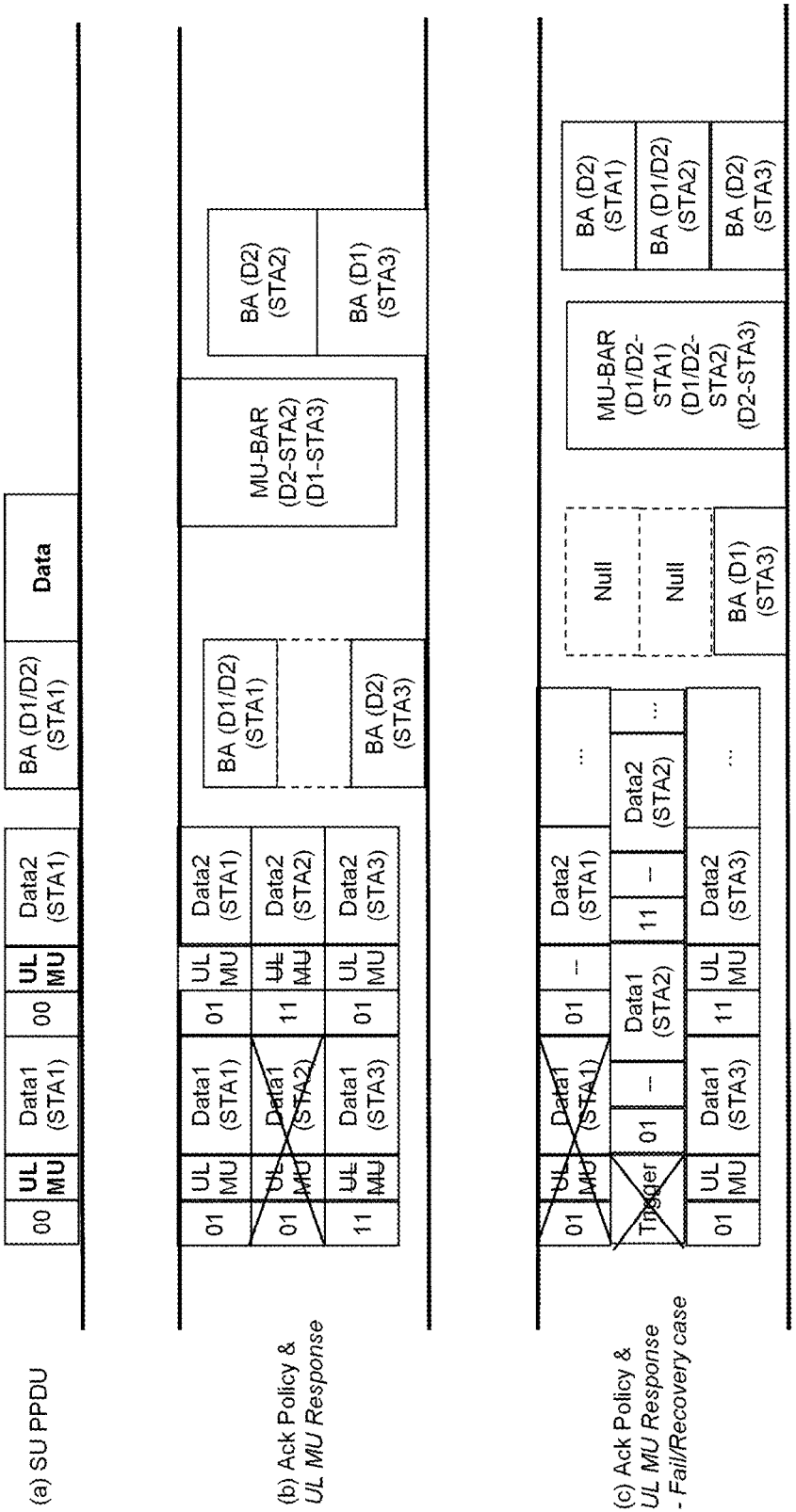
FIG. 9 shows an operation of a wireless communication terminal receiving a Block ACK frame in a cascading transmission according to an embodiment of the present invention.

FIG. 9 shows an operation of a wireless communication terminal receiving a Block ACK frame in a cascading transmission according to an embodiment of the present invention.

The wireless communication terminal transmitting the SU PPDU may request immediate ACK transmission for at least one of the A-MPDUs included in the SU PPDU to the wireless communication terminal receiving the SU PPDU without information for the separate UL MU transmission. In this case, the wireless communication terminal transmitting the SU PPDU may set the Ack Policy field value of the QoS Control field to 0(00b). This is because the wireless communication terminal transmitting UL SU PPDU does not need additional resource allocation information for UL MU transmission.

The wireless communication terminal transmitting the SU PPDU may transmit the UL MU response information to the wireless communication terminal receiving the SU PPDU and trigger the wireless communication terminal receiving the SU PPDU to transmit the data and the ACK together. The wireless communication terminal receiving the SU PPDU may transmit data together with the ACK when the MPDU included in the SU PPDU includes the UL MU response information.

The wireless communication terminal receiving the SU PPDU may transmit data in the uplink transmission duration indicated by the information for UL MU transmission. Specifically, the wireless communication terminal receiving the SU PPDU may transmit data for a time duration equal to or shorter than the uplink transmission duration indicated by the information for UL MU transmission. In this case, the uplink transmission duration may be a duration indicated by the UL PPDU Length field of the UL MU response information described above. The uplink transmission duration may be a duration indicated by the length field of the Common Info field of the trigger MPDU. In this case, the uplink transmission duration may be limited to the TXOP duration obtained by the wireless communication terminal that transmits the SU PPDU. Therefore, the wireless communication terminal transmitting the SU PPDU may set the uplink transmission duration to within the TXOP duration obtained by the wireless communication terminal that transmits the SU PPDU.

In addition, the wireless communication terminal receiving the SU PPDU may transmit ACK and data using the MCS indicated by the information for UL MU transmission. In another specific embodiment, the wireless communication terminal receiving the SU PPDU may determine that the MCS indicated by the information for UL MU transmission is an MCS recommended by the wireless communication terminal that transmitted the SU PPDU, and may transmit ACK and data using an MCS other than the MCS indicated by the information for UL MU transmission. In this case, ACK and data may be transmitted at the primary rate calculated by the wireless communication terminal receiving the SU PPDU.

In addition, the wireless communication terminal receiving the SU PPDU may not decode the RU allocation information included in the information for UL MU transmission. The RU allocation information may be information represented by the RU Allocation field included in the UL MU response information. Also, the RU allocation information may be information represented by the RU Allocation field of the Per User Info field of the trigger MPDU.

Further, when the base wireless communication terminal triggers the UL SU PPDU transmission, the base wireless communication terminal may be allowed to transmit information for UL MU transmission to wireless communication terminals that do not have Capabilities that support UL MU transmission.

In an embodiment of FIG. 9A, the base wireless communication terminal transmits an SU PPDU including data MPDU(Data1, Data2) including UL MU response information to the first station STA1. In this case, the base wireless communication terminal sets the Ack Policy field value of the QoS Control field to 0(00b). The first station STA1 receives the SU PPDU from the base wireless communication terminal. The first station STA1 transmits the data MPDU together based on the UL MU response information while transmitting a Block ACK frame for the received MPDU(Data1/Data2) based on the Ack Policy field of the QoS Control field.

When transmitting the A-MPDU, the base wireless communication terminal may configure the HT Control field of all the MPDUs included in the A-MPDU to be the same. In this case, the MPDUs included in the A-MPDU may have different Ack Policy field values. In this case, when the wireless communication terminal receiving the A-MPDU receives only one data MPDU, the wireless communication terminal receiving the A-MPDU may not transmit an ACK according to the ACK Policy field of the QoS Control field.

In an embodiment of FIG. 9(b), the base wireless communication terminal transmits DL MU PPDUs to the first station STA1 to the third station STA3. In this case, the base wireless communication terminal sets the ACK Policy field values of the QoS control fields of the MPDUs transmitted to the first station STA1, the second station STA2, and the third station STA3 differently from each other. The base wireless communication terminal sets the ACK Policy field value of the first data MPDU(Data1) to be transmitted to the second station STA2 to 1(01b). Also, the base wireless communication terminal sets the ACK Policy field value of the second data MPDU (Data2) to be transmitted to the second station STA2 to 3(11b). According to an embodiment of the present invention, since the HT Control field values of all MPDUs included in A-MPDU must be the same, the base wireless communication terminal inserts the UL MU response information into the HT Control field of the first data MPDU(Data1) and the HT Control field of the second data MPDU(Data2). In this case, the second station STA2 receives only the second data MPDU(Data2) from the base wireless communication terminal. However, since the ACK Policy field value of the second data MPDU(Data2) is 3(11b), the second station STA2 does not transmit a Block ACK frame until it receives another BAR MPDU. In this case, the UL MU response information set in the second data MPDU(Data2) transmitted from the base wireless communication terminal to the second station STA2 is not used. Therefore, when transmitting the A-MPDU, the base wireless communication terminal may differently set HT Control fields of all the MPDUs included in the A-MPDU.

If the base wireless communication terminal requests immediate transmission of an MU-Block ACK frame to one or a plurality of wireless communication terminals but fails to receive an MU-Block ACK frame, the base wireless communication terminal may transmit an MU-BAR frame to one or a plurality of wireless communication terminals. Specifically, if the base wireless communication terminal requests the transmission of the MU-Block ACK frame by setting the Ack Policy field of the HT Control field to 1(01b) but fails to receive the MU-Block ACK frame, the base wireless communication terminal may transmit an MU-BAR frame to one or a plurality of wireless communication terminals. In a specific embodiment, if the base wireless communication terminal transmits UL MU response information for MU-Block ACK transmission to one or a plurality of wireless communication terminals and sets the Ack Policy field of the HT Control field to 1(01 b) to request the MU-Block ACK frame transmission but the MU-Block ACK frame is not received, the base wireless communication terminal may transmit an MU-BAR frame to one or a plurality of wireless communication terminals. Also, if the base wireless communication terminal transmits an MU-BAR MPDU for transmitting an MU-Block ACK to one or a plurality of wireless communication terminals and sets the Ack Policy field of the HT Control field to 1(01b) to request the MU-Block ACK frame transmission but the MU-Block ACK frame is not received, the base wireless communication terminal may transmit an MU-BAR frame to one or a plurality of wireless communication terminals.

In an embodiment of FIG. 9(c), the base wireless communication terminal transmits the A-MPDU to the first station STA1 to the third station STA3. In this case, the base wireless communication terminal sets the Ack Policy field of the HT Control field of some of the MPDUs transmitted to the first station STA1 to the third station STA3 to 1(01b). Also, the base wireless communication terminal transmits UL MU response information for MU-Block ACK frame transmission to the first station STA1 and the third station STA3, and transmits a trigger MPDU for MU-Block ACK frame transmission to the second station SAT2. In this case, the first station STA1 fails to receive UL MU response information from the base wireless communication terminal. Also, the second station STA2 fails to receive the trigger MPDU from the base wireless communication terminal. Therefore, only the third station STA3 transmits the MU-Block ACK frame to the base wireless communication terminal immediately. The base wireless communication terminal transmits an MU-BAR frame to the first station STA1 to the third station STA3 to request transmission of an MU-Block ACK frame. In this case, the base wireless communication terminal sets the ACK Policy field to 1(01b) for the first station STA1 and the second station STA2 but requests the third station STA3 to transmit an ACK for the MPDU that does not receive the Block ACK, and requests the third station STA3 to transmit the ACK for the MPDU having the ACK Policy field set to 3(11b). The first to third stations STA1 to STA3 transmit an MU-Block ACK frame to the base wireless communication terminal.

Figure 10:
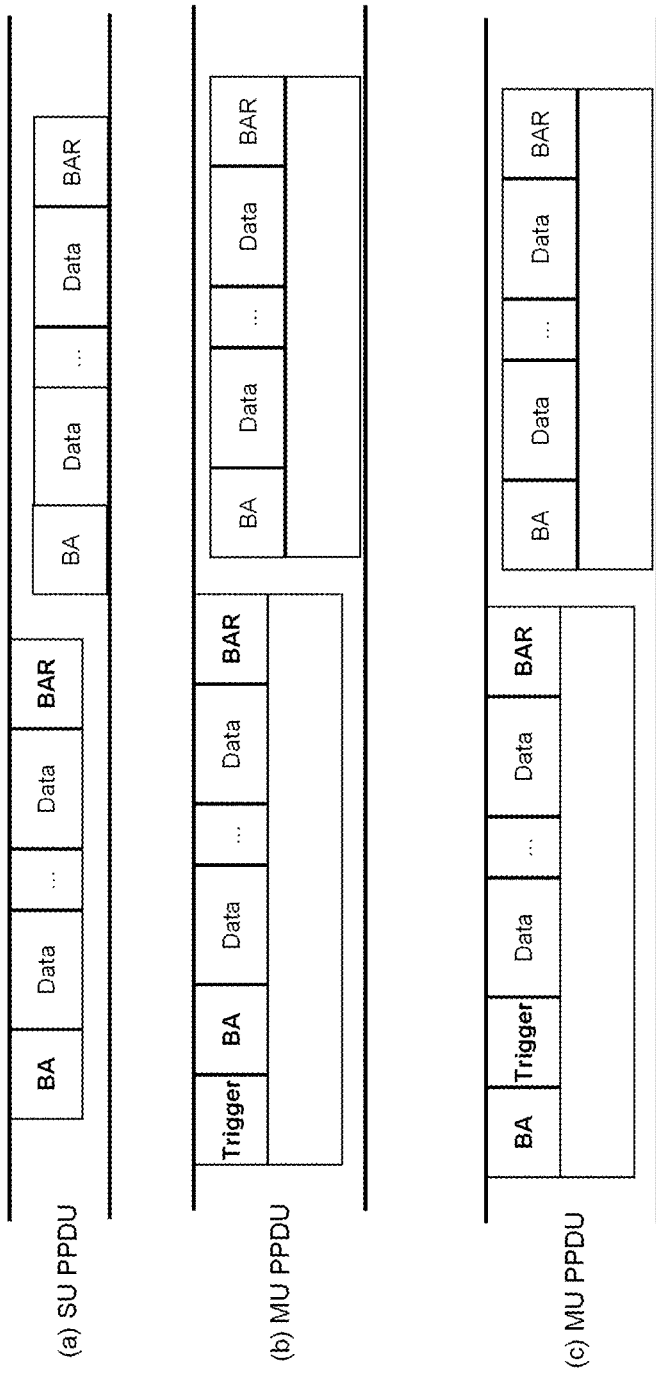
FIG. 10 shows a method for transmitting an A-MPDU by a wireless communication terminal according to an embodiment of the present invention.

FIG. 10 shows a method for transmitting an A-MPDU by a wireless communication terminal according to an embodiment of the present invention.

As described above, the wireless communication terminal may transmit at least one of the control MPDU and the management MPDU together with the data MPDU through the A-MPDU. The wireless communication terminal may transmit the A-MPDU including the Block ACK MPDU, the BAR MPDU, and the data MPDU. When the wireless communication terminal transmits the A-MPDU including the Block ACK MPDU, the BAR MPDU and the data MPDU, the wireless communication terminal may transmit the Block ACK MPDU to the first MPDU of the A-MPDU. In addition, when the wireless communication terminal transmits the A-MPDU including the Block ACK MPDU, the BAR MPDU, and the data MPDU, the wireless communication terminal may transmit the BAR MPDU to the last MPDU of the A-MPDU. Specifically, when a wireless communication terminal transmits an A-MPDU including a Block ACK MPDU, a BAR MPDU, and a data MPDU, the wireless communication terminal may transmit the Block ACK MPDU to the first MPDU of the A-MPDU and the BAR MPDU to the last MPDU of the A-MPDU. The wireless communication terminal receiving the A-MPDU may receive the Block ACK MPDU and remove the MPDU indicated by the Block ACK MPDU in the transmission buffer. Specifically, the wireless communication terminal may transmit the A-MPDU including the Block ACK MPDU as the first MPDU and the BAR MPDU as the last MPDU as shown in FIG. 10(a). In this case, the wireless communication terminal receiving the A-MPDU may transmit the A-MPDU including the Block ACK MPDU as the first MPDU and the BAR MPDU as the last MPDU in response to the received A-MPDU.

The base wireless communication terminal may transmit the trigger MPDU together with the data MPDU. In this case, the trigger MPDU indicates resource allocation information for uplink transmission. Specifically, the base wireless communication terminal may transmit an A-MPDU including a trigger MPDU, a Block ACK MPDU, a BAR MPDU, and a data MPDU. In a specific embodiment, when the base wireless communication terminal transmits an A-MPDU including a trigger MPDU, a Block ACK MPDU, a BAR MPDU, and a data MPDU, the base wireless communication terminal may transmit the trigger MPDU as the first MPDU of the A-MPDU. Further, when the base wireless communication terminal transmits the A-MPDU including the trigger MPDU, the Block ACK MPDU, the BAR MPDU, and the data MPDU, the base wireless communication terminal may transmit the Block ACK MPDU as the second MPDU of the A-MPDU. Specifically, when the base wireless communication terminal transmits an A-MPDU including a trigger MPDU, a Block ACK MPDU, a BAR MPDU and a data MPDU, as in an embodiment of FIG. 10(b), the base wireless communication terminal may transmit the A-MPDU including the trigger MPDU as the first MPDU of the A-MPDU, including the Block ACK MPDU as the second MPDU of the A-MPDU, and including the BAR MPDU as the last MPDU. In this case, the wireless communication terminal receiving the A-MPDU may transmit the A-MPDU including the Block ACK MPDU as the first MPDU and the BAR MPDU as the last MPDU in response to the received A-MPDU. When the base wireless communication terminal transmits the trigger MPDU as the first MPDU of the A-MPDU, it is possible to reduce the processing burden for the wireless communication terminal receiving the A-MPDU to prepare for uplink transmission up to the uplink transmission start time point. However, in such embodiments, the wireless communication terminal receiving the A-MPDU may remove the MPDU received by the base wireless communication terminal relatively late in the transmission buffer.

In another specific embodiment, when the base wireless communication terminal transmits an A-MPDU including a trigger MPDU, a Block ACK MPDU, a BAR MPDU, and a data MPDU, the base wireless communication terminal may transmit the Block ACK MPDU as the first MPDU of the A-MPDU. Further, when the base wireless communication terminal transmits the A-MPDU including the trigger MPDU, the Block ACK MPDU, the BAR MPDU, and the data MPDU, the base wireless communication terminal may transmit the trigger MPDU as the second MPDU of the A-MPDU. Further, when the base wireless communication terminal transmits the A-MPDU including the trigger MPDU, the Block ACK MPDU, the BAR MPDU, and the data MPDU, the base wireless communication terminal may transmit the BAR MPDU as the last MPDU of the A-MPDU. Specifically, when the base wireless communication terminal transmits an A-MPDU including a trigger MPDU, a Block ACK MPDU, a BAR MPDU and a data MPDU, as in an embodiment of FIG. 10(c), the base wireless communication terminal may transmit the A-MPDU including the Block ACK MPDU as the first MPDU of the A-MPDU, including the trigger MPDU as the second MPDU of the A-MPDU, and including the BAR MPDU as the last MPDU. In this case, the wireless communication terminal receiving the A-MPDU may transmit the A-MPDU including the Block ACK MPDU as the first MPDU and the BAR MPDU as the last MPDU in response to the received A-MPDU. When the base wireless communication terminal transmits the Block ACK MPDU to the first MPDU of the A-MPDU and the trigger MPDU to the second MPDU of the A-MPDU, it is possible to reduce the processing burden for the wireless communication terminal receiving the A-MPDU to prepare for uplink transmission up to the uplink transmission start time point. In this case, the wireless communication terminal receiving the A-MPDU may relatively quickly remove the MPDU received by the base wireless communication terminal in the transmission buffer.

Figure 11:
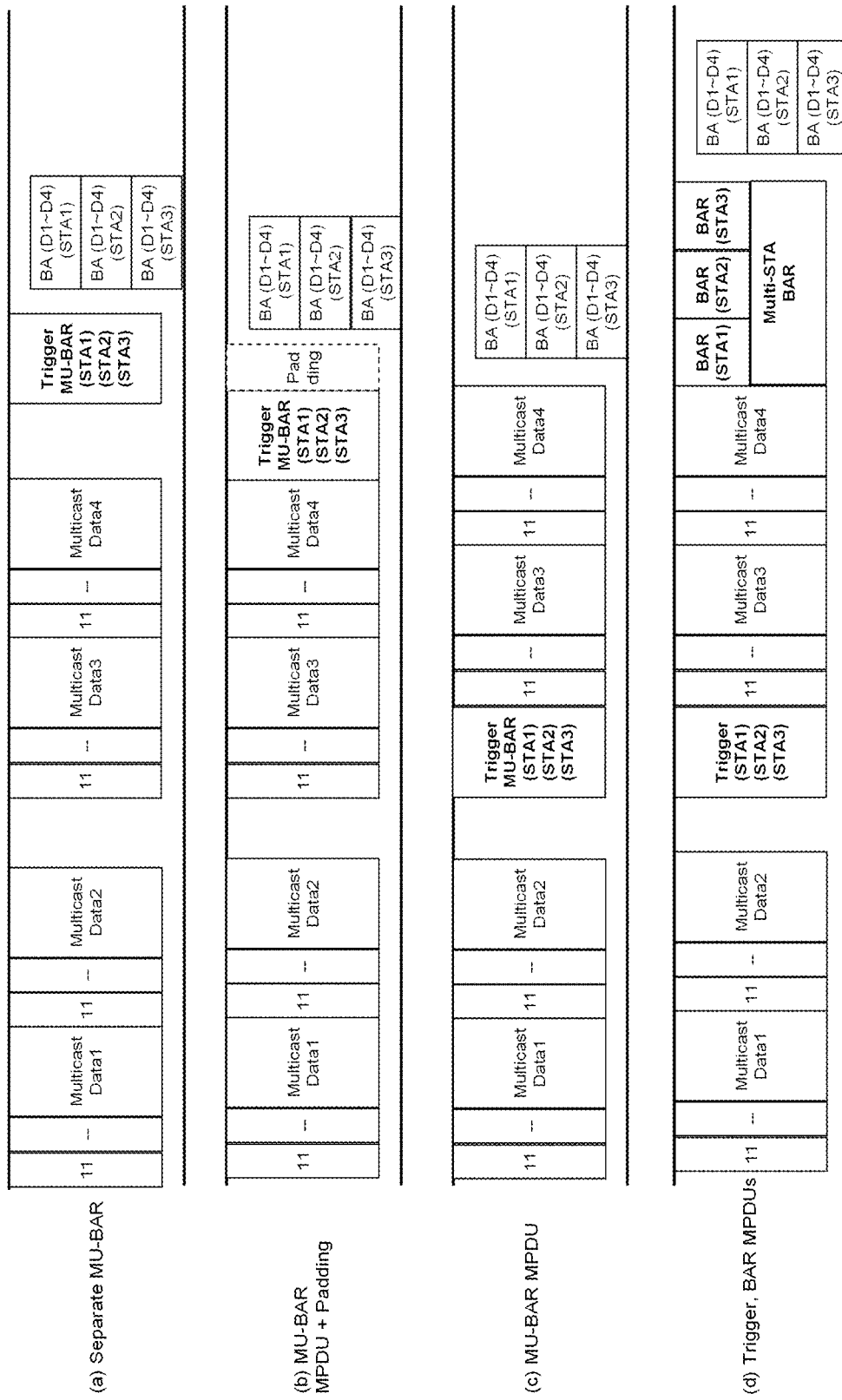
FIG. 11 shows a method of transmitting multicast data through an A-MPDU by a wireless communication terminal according to an embodiment of the present invention.

FIG. 11 shows a method of transmitting multicast data through an A-MPDU by a wireless communication terminal according to an embodiment of the present invention.

As described with reference to FIG. 7, the base wireless communication terminal may transmit the MU-BAR frame, which is a variant of the trigger frame. Specifically, the base wireless communication terminal may transmit an MU-BAR frame and request transmission of MU-Block ACKs of a plurality of wireless communication terminals receiving the MU-BAR frame. The base wireless communication terminal may simplify a procedure required for receiving a Block ACK frame from a plurality of wireless communication terminals. In an embodiment of FIG. 11(a), the base wireless communication terminal transmits multicast data to the first station STA1 to the third station STA3. In this case, the base wireless communication terminal sets the Ack Policy field of the QoS Control field to 3(11b) to signal to the first station STA1 to the third station STA3 to request transmission of a Block ACK frame. The base wireless communication terminal transmits the MU-BAR frame to the first station STA1 to the third station STA3. The first to third stations STA1 to STA3 transmit an MU-Block ACK frame to the base wireless communication terminal.

The base wireless communication terminal may transmit the A-MPDU including the MU-BAR MPDU and the data MPDU. When the base wireless communication terminal transmits the A-MPDU including the MU-BAR MPDU and the data MPDU, the base wireless communication terminal may transmit the MU-BAR MPDU as the last MPDU of the A-MPDU. In this case, the base wireless communication terminal may transmit padding after the MU-BAR MPDU transmission. In an embodiment of FIG. 11(b), the base wireless communication terminal transmits multicast data to the first station STA1 to the third station STA3. In this case, the base wireless communication terminal sets the Ack Policy field of the QoS Control field to 3(11b) to signal to the first station STA1 to the third station STA3 to request transmission of a Block ACK frame. The base wireless communication terminal transmits the A-MPDU including the MU-BAR frame and the data frame to the first station STA1 to the third station STA3. In this case, the base wireless communication terminal transmits the MU-BAR frame as the last MPDU of the A-MPDU. Also, the base wireless communication terminal transmits padding after the MU-BAR frame transmission. The first to third stations STA1 to STA3 transmit an MU-Block ACK frame to the base wireless communication terminal. Through this embodiment, the base wireless communication terminal may reduce the processing burden for the wireless communication terminal receiving the A-MPDU to transmit the MU-Block ACK.

In another specific embodiment, when the base wireless communication terminal transmits the A-MPDU including the MU-BAR MPDU and the data MPDU, the base wireless communication terminal may transmit the MU-BAR MPDU as the first MPDU of the A-MPDU. As described above, since the MU-BAR frame is a variant of the trigger frame, the base wireless communication terminal may treat the MU-BAR MPDU like the trigger MPDU when transmitting the A-MPDU including the MU-BAR MPDU. In an embodiment of FIG. 11(c), the base wireless communication terminal transmits multicast data to the first station STA1 to the third station STA3. In this case, the base wireless communication terminal sets the Ack Policy field of the QoS Control field to 3(11b) to signal to the first station STA1 to the third station STA3 to request transmission of a Block ACK frame. The base wireless communication terminal transmits the A-MPDU including the MU-BAR frame and the data frame to the first station STA1 to the third station STA3. In this case, the base wireless communication terminal transmits the MU-BAR frame as the first MPDU of the A-MPDU. The first to third stations STA1 to STA3 transmit an MU-Block ACK frame to the base wireless communication terminal. Through this embodiment, the base wireless communication terminal may reduce the processing burden for the wireless communication terminal receiving the A-MPDU to prepare for the MU-Block ACK transmission until the MU-Block ACK transmission start time point. In this embodiment, the wireless communication terminal receiving the A-MPDU may need to configure a Block ACK frame based on the BAR MPDU, and then configure a Block ACK frame according to whether the MPDU is transmitted through the A-MPDU after the BAR MPDU. Accordingly, the processing burden for the wireless communication terminal receiving the A-MPDU to transmit the Block ACK frame may increase.

The base wireless communication terminal may transmit the A-MPDU including the trigger MPDU and the plurality of BAR MPDUs instead of the MU-BAR MPDU. In this case, the base wireless communication terminal may include a trigger MPDU as a first MPDU, not a MU-BAR MPDU, and may transmit a plurality of BAR MPDUs after transmitting all other MPDUs including A-MPDUs. In this case, the receiver address of the BAR MPDU may be different from the receiver address of the data MPDU including the multicast data. To this end, the base wireless communication terminal may make an exception to the principle that all MPDUs having the same receiver address are transmitted within one A-MPDU. In another specific embodiment, the base wireless communication terminal may transmit a Multi-STA BAR MPDU including BAR information for a plurality of wireless communication terminals instead of a plurality of BAR MPDUs. In this case, the Multi-STA BAR MPDU may have the same receiver address as the data MPDU including the multicast data. In addition, the BAR information for each of the plurality of wireless communication terminals included in the Multi-STA BAR MPDU may be distinguished by the AID of each of the plurality of wireless communication terminals. In an embodiment of FIG. 11(d), the base wireless communication terminal transmits multicast data to the first station STA1 to the third station STA3. In this case, the base wireless communication terminal sets the Ack Policy field of the QoS Control field to 3(11b) to signal to the first station STA1 to the third station STA3 to request transmission of a Block ACK frame. The base wireless communication terminal transmits an A-MPDU including a trigger frame, three BAR frames and a data frame to the first station STA1 to the third station STA3. In this case, the base wireless communication terminal transmits the trigger frame to the first MPDU of the A-MPDU, and then transmits the three BAR MPDUs after transmitting all the other MPDUs included in the A-MPDU. In addition, the base wireless communication terminal may transmit a Multi-STA BAR MPDU including BAR information on the first station STA1 to the third station STA3 instead of the three BAR MPDUs. The first to third stations STA1 to STA3 transmit an MU-Block ACK frame to the base wireless communication terminal. Through this embodiment, the wireless communication terminal receiving the A-MPDU may efficiently prepare the Block ACK frame transmission.

Figure 12:
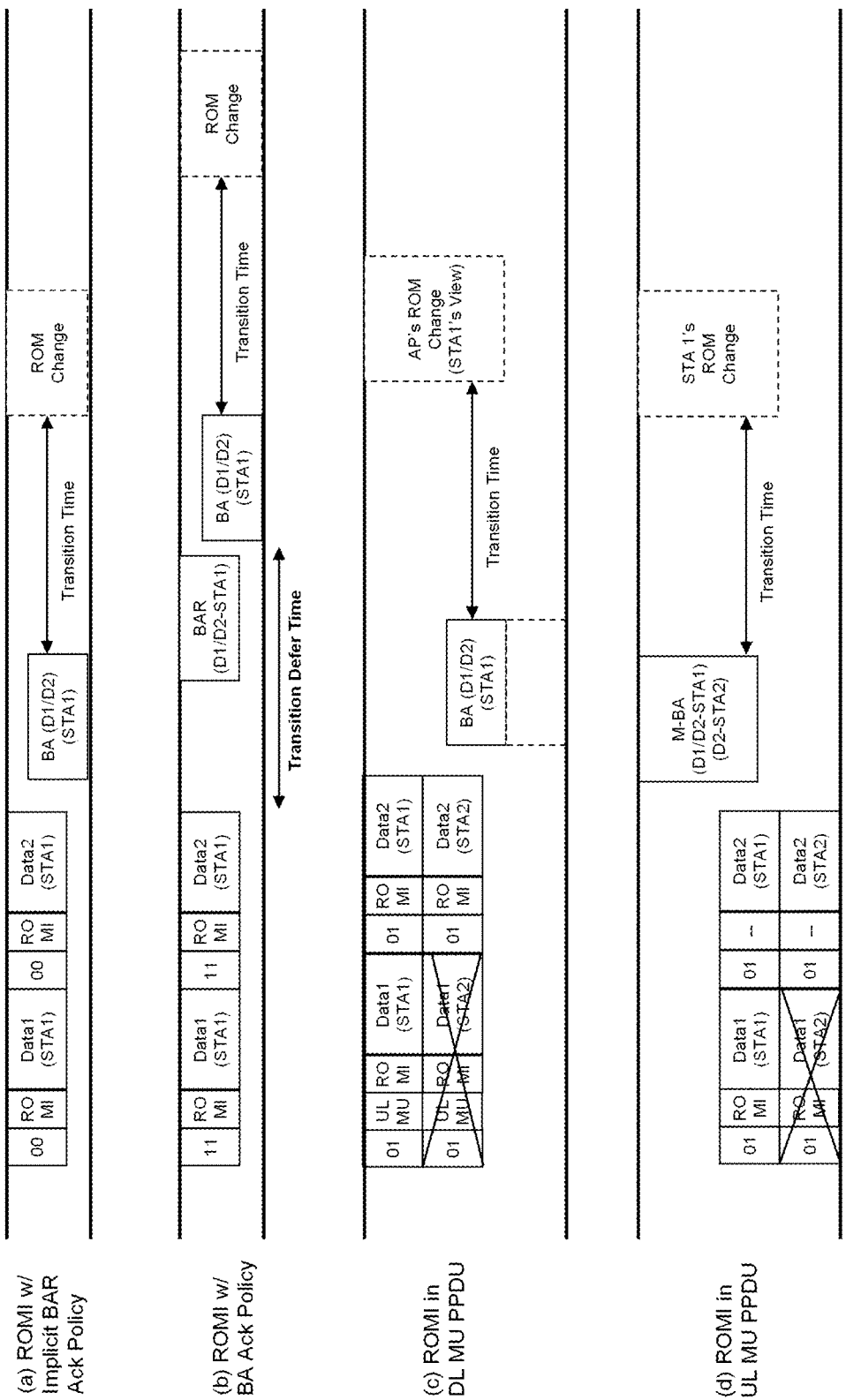
FIG. 12 shows an operation of the wireless communication terminal according to an embodiment of the present invention to change the receiver operation mode of the wireless communication terminal.

FIG. 12 shows an operation of the wireless communication terminal according to an embodiment of the present invention to change the receiver operation mode of the wireless communication terminal.

The wireless communication terminal may transmit information on the operation mode change through the HT Control field. Specifically, the wireless communication terminal may transmit information on the operation mode change through the MPDU included in the SU PPDU. In this case, information on the operation mode change may be Receiver Operation Mode Indication (ROMI). In yet another specific embodiment, the information on the operation mode change may be Transmitter Operation Mode Indication (TOMI). The information on the operation mode change includes information on parameters related to the operation mode that the wireless communication terminal that transmits the information on the operation mode change is to change. Specifically, the information on the operation mode change may include information on the number of receivable spatial streams. In addition, the information on the operation mode change may include information on the receivable frequency bandwidth. In particular, the information on the operation mode change may include information on the number of transmittable spatial streams. In addition, the information on the operation mode change may include information on the transmittable frequency bandwidth. When the wireless communication terminal receiving the information on the operation mode change transmits the ACK, the wireless communication terminal transmitting the information on the receiver operation mode change may change the operation mode for the wireless communication terminal transmitting the ACK. In this case, the wireless communication terminal transmitting the information on the operation mode change may change the operation mode after the transition time elapses from when the ACK is received.

In an embodiment of FIG. 12(a), the base wireless communication terminal transmits to the first station STA1 an A-MPDU including two data MPDUs including ROMI. In this case, the base wireless communication terminal sets the ACK Policy field value of the QoS Control field of the data MPDU to 0(00b) to request immediate ACK transmission for the data MPDU. The first station STA1 transmits a Block ACK frame indicating that two data MPDUs included in the A-MPDU are received. The base wireless communication terminal receives the Block ACK frame from the first station STA1 and changes the receiver operation mode.

In an embodiment of FIG. 12(b), the base wireless communication terminal transmits to the first station STA1 an A-MPDU including two data MPDUs including ROMI. In this case, the base wireless communication terminal sets the ACK Policy field value of the QoS Control field of the data MPDU to 3(11b) to signal that the base wireless communication terminal will request Block ACK frame transmission for the data MPDU. Then, the base wireless communication terminal transmits a BAR frame to request immediate transmission of a Block ACK frame to the data MPDU.

The base wireless communication terminal may change the receiver operation mode more quickly in an embodiment of FIG. 12(a) than in an embodiment of FIG. 12(b). Accordingly, the wireless communication terminal may request an immediate ACK transmission for the MPDU including information on the operation mode change. Specifically, the wireless communication terminal may set the ACK Policy field value of the QoS Control field of the MPDU including the information on the operation mode change to 0(00b).

If the wireless communication terminal receiving the DL MU PPDU does not receive the information on the UL MU transmission, even though the wireless communication terminal receives information on the operation mode change, the wireless communication terminal may not be able to transmit the ACK for the MPDU including the information on the operation mode change. In this case, the base wireless communication terminal may not be able to quickly change the operation mode. In an embodiment of FIG. 12C, the base wireless communication terminal transmits to the first station STA1 and the second station STA2 an A-MPDU including a plurality of MPDUs including ROMI. In this case, the second station STA2 receives all the MPDUs transmitted by the base wireless communication terminal and transmits a Block ACK frame for the received MPDU. The first station STA1 does not receive the MPDU including the UL MU response information. Therefore, even though the first station STA1 receives the ROMI from the base wireless communication terminal, the first station STA1 fails to transmit the ACK for the MPDU including the ROMI. Therefore, the base wireless communication terminal changes only the receiver operation mode for the first station STA1 and fails to change the receiver operation mode of the second station STA2.

Therefore, when the base wireless communication terminal transmits information on the operation mode change through the MPDU included in the DL MU PPDU, the base wireless communication terminal may insert information on the operation mode change into the broadcast MPDU. In this case, the broadcast MPDU is an MPDU received by all the wireless communication terminals receiving the DL MU PPDU.

The wireless communication terminal may transmit information on the operation mode change through the MPDU included in the UL MU PPDU. Specifically, the wireless communication terminal may transmit information on the operation mode change through the MPDU included in the trigger-based PPDU. In an embodiment of FIG. 12(d), the first station STA1 and the second station STA2 transmit the ROMI to the base wireless communication terminal through the MPDU included in the UL MU PPDU. The base wireless communication terminal receives all the MPDUs transmitted by the first station STA1. The base wireless communication terminal does not receive the MPDU including the ROMI among the plurality of MPDUs transmitted by the second station STA2. Therefore, the base wireless communication terminal transmits a Block ACK frame indicating that all the MPDUs transmitted by the first station STA1 and the MPDUs not including the ROMI among the MPDUs transmitted by the second station STA2 are received. The first station STA1 receives the Block ACK frame from the base wireless communication terminal and changes the receiver operation mode for the base wireless communication terminal.

As in an embodiments described with reference to FIGS. 12(a) to 12(d), the wireless communication terminal may request an immediate ACK transmission for the MPDU including information on the operation mode change. Further, the wireless communication terminal may transmit the MPDU including the information on the operation mode change through the SU PPDU. Also, the wireless communication terminal may transmit the MPDU including the information on the operation mode change through the trigger-based PPDU.

Figure 13:
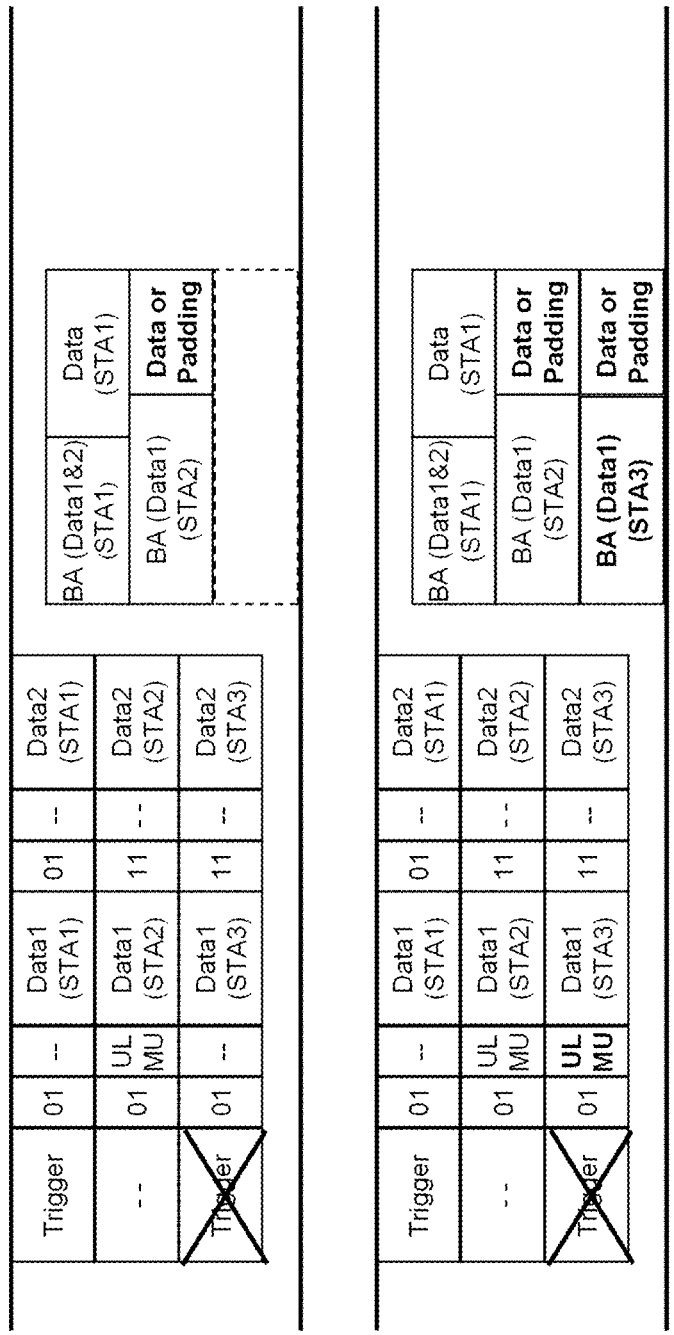
FIG. 13 shows an operation of transmitting a UL MU PPDU in a MU cascading transmission process according to an embodiment of the present invention.

FIG. 13 shows an operation of transmitting a UL MU PPDU in a MU cascading transmission process according to an embodiment of the present invention.

When the wireless communication terminal transmits the UL MU PPDU based on the UL MU response information, the UL MU PPDU may be transmitted under the following conditions. Specifically, when the wireless communication terminal transmits the A-MPDU including the ACK MPDU and the data MPDU through the UL MU PPDU based on the UL MU response information, the UL MU PPDU may be transmitted under the following conditions.

When the wireless communication terminal transmits the UL MU PPDU based on the UL MU response information, the wireless communication terminal may transmit the UL MU PPDU without carrier sensing. In a specific embodiment, when a wireless communication terminal transmits an UL MU PPDU, the requirement of carrier sensing of the wireless communication terminal may be determined according to the length of the uplink transmission duration. Therefore, when the wireless communication terminal transmits the UL MU PPDU based on the UL MU response information, the wireless communication terminal may perform carrier sensing based on the length of the uplink transmission duration. For example, when the wireless communication terminal transmits the UL MU PPDU based on the UL MU response information, if the length of the uplink transmission duration is larger than the designated value, carrier sensing of the wireless communication terminal may be required. In this case, when the channel is idle, the wireless communication terminal may be able to start transmission of the UL MU PPDU. The uplink transmission duration may be a duration indicated by the UL PPDU Length field of the UL MU response information described above.

When the wireless communication terminal transmits the UL MU PPDU based on the UL MU response information, the wireless communication terminal may not allow the Spatial Reuse (SR) transmission to the UL MU PPDU. Specifically, when the wireless communication terminal transmits the UL MU PPDU, the signaling information indicating whether or not the SR transmission is allowed may be set such that SR transmission is not allowed. In a specific embodiment, when the wireless communication terminal transmits the UL MU PPDU, the wireless communication terminal may set the SR parameter of the transmission parameter TXVECTOR to a value indicating that the SR transmission is not allowed. In another specific embodiment, when the wireless communication terminal transmits the UL MU PPDU based on the UL MU response information, the wireless communication terminal may set whether or not to allow the SR transmission according to the indication from the base wireless communication terminal.

Also, when the wireless communication terminal transmits the UL MU PPDU based on the UL MU response information, the wireless communication terminal may use the frequency bandwidth of the same size as the frequency bandwidth of the DL MU PPDU including the UL MU response information as the BW value of the transmission parameter TXVECTOR. In this case, the BW value may indicate the BW field value of the HE-SIG-A field of the UL MU PPDU.

Further, when the wireless communication terminal transmits the UL MU PPDU based on the UL MU response information, the wireless communication terminal may use the default CP/LTF type of the UL MU PPDU.

Further, when the wireless communication terminal transmits the UL MU PPDU based on the UL MU response information, the wireless communication terminal may not use MU-MIMO. Further, when the wireless communication terminal transmits the UL MU PPDU based on the UL MU response information, the wireless communication terminal may not use MU-MIMO LTF Mode. Specifically, when the wireless communication terminal transmits the UL MU PPDU, the wireless communication terminal may set the SS Allocation parameter of the transmission parameter TXVECTOR to 0. Further, when the wireless communication terminal transmits the UL MU PPDU, the wireless communication terminal may set the number of spatial streams of the transmission parameter TXVECTOR to 0.

In addition, when the wireless communication terminal transmits the UL MU PPDU based on the UL MU response information, the wireless communication terminal may transmit the UL MU PPDU using a Binary Convolutional Coding (BCC) code. Specifically, when the wireless communication terminal transmits the UL MU PPDU, the wireless communication terminal may set the Coding Type parameter of the transmission parameter TXVECTOR to 0. Further, when the wireless communication terminal transmits the UL MU PPDU, the wireless communication terminal may set the LDPC Extra parameter of the transmission parameter TXVECTOR to 0.

In addition, when the wireless communication terminal transmits the UL MU PPDU based on the UL MU response information, the wireless communication terminal may transmit the UL MU PPDU without using the STBC. Specifically, when the wireless communication terminal transmits the UL MU PPDU, the wireless communication terminal may set the STBC parameter of the transmission parameter TXVECTOR to 0.

Also, when the wireless communication terminal transmits the UL MU PPDU based on the UL MU response information, even if the UL MU response information is separately transmitted for each A-MPDU in the DL MU PPDU, the wireless communication terminal may not arbitrarily expand the number of symbols for transmitting the LTF. Specifically, the wireless communication terminal may transmit the LTF through one symbol. In a specific embodiment, when a wireless communication terminal transmits an UL MU PPDU, the wireless communication terminal may set the number of LTFs parameter of the transmission parameter TXVECTOR to 1.

Further, when the wireless communication terminal transmits the UL MU PPDU based on the UL MU response information, the wireless communication terminal may not perform the power control based on the AP TX Power/Target RSSI information.

Further, when the wireless communication terminal transmits the UL MU PPDU based on the UL MU response information, the wireless communication terminal may transmit a UL MU PPDU by setting a Packet Extension field according to a method designated by the base wireless communication terminal. Specifically, when the wireless communication terminal transmits the UL MU PPDU based on the UL MU response information, the wireless communication terminal may set the length of the packet extension field to a length specified by the base wireless communication terminal to transmit the UL MU PPDU.

Further, when the wireless communication terminal transmits the UL MU PPDU based on the UL MU response information, the wireless communication terminal may select an MCS to be used in transmission of the UL MU PPDU according to the ACK rate selection method based on the MCS of the received data MPDU.

In addition, when the wireless communication terminal transmits the UL MU PPDU based on the UL MU response information, the wireless communication terminal may transmit the UL MU PPDU without using the DCM.

The wireless communication terminal may increase the efficiency of MU cascading transmission using UL MU response information through these embodiments. Further, when the wireless communication terminal transmits the UL MU PPDU based on the UL MU response information through these embodiments, it is possible to solve the problem that the UL MU PPDU transmission operation becomes unclear due to the format difference between the trigger frame and the UL MU response information.

When the base wireless communication terminal triggers uplink transmission of a plurality of wireless communication terminals through the DL MU PPDU, the base wireless communication terminal may transmit only one of the trigger MPDU and the UL MU response information for each of a plurality of wireless communication terminals. Therefore, the A-MPDU may not simultaneously include the UL MU response information and the trigger MPDU that triggers the same wireless communication terminal as the wireless communication terminal indicated by the UL MU response information. Specifically, as in an embodiment of FIG. 13(a), the base wireless communication terminal may transmit the DL MU PPDU including the trigger MPDU and the UL MU response information to the first station STA1 to the third station STA3. In this case, the base wireless communication terminal may transmit the trigger MPDU to the first station STA1, transmits UL MU response information to the second station STA2, and transmit the trigger MPDU to the third station STA3. Through these embodiments, the base wireless communication terminal may lower the complexity for configuring the trigger MPDU and UL MU response information.

In an embodiment of FIG. 13(*a*), the third station STA3 receives only the data MPDU from the base wireless communication terminal and does not receive the trigger MPDU. Therefore, the third station STA3 may not transmit the UL MU PPDU to the base wireless communication terminal. When the base wireless communication terminal triggers uplink transmission of a plurality of wireless communication terminals through the DL MU PPDU, the base wireless communication terminal may transmit both the trigger MPDU and the UL MU response information for each of a plurality of wireless communication terminals. In this case, the UL MU response information and the information indicated by the trigger MPDU should be the same or similar. In an embodiment of FIG. 13(*b*), the third station STA3 does not receive the trigger MPDU but receives the UL MU response information. Therefore, the third station STA transmits the UL MU PPDU to the base wireless communication terminal.

Figure 14:
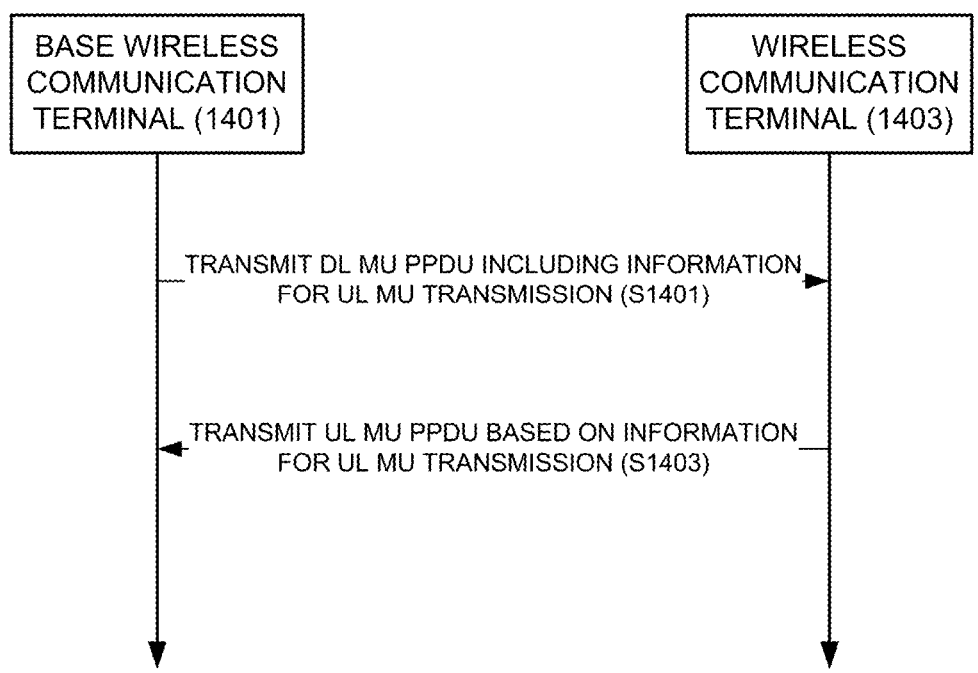
FIG. 14 shows an operation of a wireless communication terminal according to an embodiment of the present invention.

FIG. 14 shows an operation of a wireless communication terminal according to an embodiment of the present invention.

The base wireless communication terminal 1401 transmits a DL MU PPDU including information for UL MU transmission to a plurality of wireless communication terminals including the wireless communication terminal 1403 (S1401). The UL MU transmission information may be the UL MU response information described above. In addition, the information for UL MU transmission may be the trigger MPDU described above. In this case, the UL MU response information may be information included in the MAC header. Specifically, the UL MU response information may be information for scheduling a trigger-based PPDU including an ACK. In addition, the trigger-based PPDU may be an UL MU PPDU.

Also, the base wireless communication terminal 1401 may transmit the A-MPDU through the DL MU PPDU. In this case, the base wireless communication terminal 1401 may transmit at least one of the control MPDU and the management MPDU together with the data MPDU as described above. The base wireless communication terminal 1401 may transmit an A-MPDU including a Block ACK MPDU, a BAR MPDU, and a data MPDU. When the base wireless communication terminal 1401 transmits an A-MPDU including a Block ACK MPDU, a BAR MPDU, and a data MPDU, the base wireless communication terminal 1401 may transmit the Block ACK MPDU as the first MPDU of the A-MPDU. Further, when the base wireless communication terminal 1401 transmits the A-MPDU including the Block ACK MPDU, the BAR MPDU, and the data MPDU, the base wireless communication terminal 1401 may transmit the BAR MPDU as the last MPDU of the A-MPDU. Specifically, when the base wireless communication terminal 1401 transmits an A-MPDU including a Block ACK MPDU, a BAR MPDU, and a data MPDU, the base wireless communication terminal 1401 may transmit the Block ACK MPDU as the first MPDU of the A-MPDU and the BAR MPDU as the last MPDU of the A-MPDU. Specifically, the base wireless communication terminal 1401 may transmit the A-MPDU as in an embodiment described with reference to FIG. 10.

In addition, the base wireless communication terminal 1401 may transmit only one of the trigger MPDU and the UL MU response information to the wireless communication terminal 1403. Accordingly, the A-MPDU transmitted to the wireless communication terminal 1403 may not simultaneously include the UL MU response information for the wireless communication terminal 1403 and the trigger MPDU that triggers the wireless communication terminal 1403. In another specific embodiment, the base wireless communication terminal 1401 may transmit both the trigger MPDU and the UL MU response information to the wireless communication terminal 1403.

The wireless communication terminal 1403 transmits the UL MU PPDU based on the information for UL MU transmission (S1403). Specifically, the wireless communication terminal 1403 may obtain information for UL MU transmission from the DL MU PPDU and transmit UL MU PPDU based on the information for the obtained UL MU transmission. In this case, the UL MU transmission information may be the UL MU response information as described above. When the wireless communication terminal 1403 transmits the UL MU PPDU based on the UL MU response information, the wireless communication terminal 1403 may transmit the UL MU PPDU without carrier sensing. In a specific embodiment, when a wireless communication terminal 1403 transmits an UL MU PPDU, the requirement of carrier sensing of the wireless communication terminal may be determined according to the length of the uplink transmission duration. Therefore, when the wireless communication terminal 1403 transmits the UL MU PPDU based on the UL MU response information, the wireless communication terminal 1403 may perform carrier sensing based on the length of the uplink transmission duration. For example, when the wireless communication terminal 1403 transmits the UL MU PPDU based on the UL MU response information, if the length of the uplink transmission duration is larger than the designated value, carrier sensing of the wireless communication terminal 1403 may be required. In this case, when the channel is idle, the wireless communication terminal 1403 may be able to start transmission of the UL MU PPDU. The uplink transmission duration may be a duration indicated by the UL PPDU Length field of the UL MU response information described above.

When the wireless communication terminal 1403 transmits the UL MU PPDU based on the UL MU response information, the wireless communication terminal 1403 may not allow the Spatial Reuse (SR) transmission to the UL MU PPDU. Specifically, when the wireless communication terminal 1403 transmits the UL MU PPDU, the signaling information indicating whether or not the SR transmission is allowed may be set such that SR transmission is not allowed. In a specific embodiment, when the wireless communication terminal 1403 transmits the UL MU PPDU, the wireless communication terminal may set the SR parameter of the transmission parameter TXVECTOR to a value indicating that the SR transmission is not allowed.

Also, when the wireless communication terminal 1403 transmits the UL MU PPDU based on the UL MU response information, the wireless communication terminal 1403 may use the frequency bandwidth of the same size as the frequency bandwidth of the DL MU PPDU including the UL MU response information as the BW value of the transmission parameter TXVECTOR. Specifically, when the wireless communication terminal 1403 transmits the UL MU PPDU based on the UL MU response information, the wireless communication terminal 1403 may use the same frequency band as the frequency band of the DL MU PPDU including the UL MU response information.

Further, when the wireless communication terminal 1403 transmits the UL MU PPDU based on the UL MU response information, the wireless communication terminal 1403 may use the default CP/LTF type of the UL MU PPDU.

Further, when the wireless communication terminal 1403 transmits the UL MU PPDU based on the UL MU response information, the wireless communication terminal 1403 may not use MU-MIMO. Accordingly, when the wireless communication terminal 1403 transmits the UL MU PPDU based on the UL MU response information, the wireless communication terminal 1403 may not use MU-MIMO LTF Mode. Specifically, when the wireless communication terminal 1403 transmits the UL MU PPDU, the wireless communication terminal 1403 may set the SS Allocation parameter of the transmission parameter TXVECTOR to 0.

In addition, when the wireless communication terminal 1403 transmits the UL MU PPDU based on the UL MU response information, the wireless communication terminal 1403 may transmit the UL MU PPDU using a Binary Convolutional Coding (BCC) code. Specifically, when the wireless communication terminal 1403 transmits the UL MU PPDU, the wireless communication terminal may set the Coding Type parameter of the transmission parameter TXVECTOR to 0. Further, when the wireless communication terminal 1403 transmits the UL MU PPDU, the wireless communication terminal may set the LDPC Extra parameter of the transmission parameter TXVECTOR to 0.

In addition, when the wireless communication terminal 1403 transmits the UL MU PPDU based on the UL MU response information, the wireless communication terminal 1403 may transmit the UL MU PPDU without using the STBC. Specifically, when the wireless communication terminal 1403 transmits the UL MU PPDU, the wireless communication terminal 1403 may set the STBC parameter of the transmission parameter TXVECTOR to 0.

Also, when the wireless communication terminal 1403 transmits the UL MU PPDU based on the UL MU response information, even if the UL MU response information is separately transmitted for each A-MPDU in the DL MU PPDU, the wireless communication terminal 1403 may not arbitrarily expand the number of symbols for transmitting the LTF. Specifically, the wireless communication terminal 1403 may transmit the LTF through one symbol. In a specific embodiment, when a wireless communication terminal transmits an UL MU PPDU, the wireless communication terminal may set the number of LTFs parameter of the transmission parameter TXVECTOR to 1.

Further, when the wireless communication terminal 1403 transmits the UL MU PPDU based on the UL MU response information, the wireless communication terminal 1403 may not perform the power control based on the AP TX Power/Target RSSI information.

Further, when the wireless communication terminal 1403 transmits the UL MU PPDU based on the UL MU response information, the wireless communication terminal 1403 may not perform the power control based on the AP TX Power/Target RSSI information.

Further, when the wireless communication terminal 1403 transmits the UL MU PPDU based on the UL MU response information, the wireless communication terminal 1403 may set a Packet Extension field according to a method designated by the base wireless communication terminal 1401 to transmit a UL MU PPDU. Specifically, when the wireless communication terminal 1403 transmits the UL MU PPDU based on the UL MU response information, the wireless communication terminal 1403 may set the length of the packet extension field to a length specified by the base wireless communication terminal 1403 to transmit the UL MU PPDU. Further, when the wireless communication terminal 1403 transmits the UL MU PPDU based on the UL MU response information, the wireless communication terminal 1403 may select an MCS to be used in transmission of the UL MU PPDU according to the ACK rate selection method based on the MCS of the received data MPDU.

In addition, when the wireless communication terminal 1403 transmits the UL MU PPDU based on the UL MU response information, the wireless communication terminal 1403 may transmit the UL MU PPDU without using the DCM.

As described above, when transmitting the DL MU PPDU, the base wireless communication terminal 1401 may request the wireless communication terminal 1403 to transmit the ACK and specify the format of the ACK. The base wireless communication terminal 1401 may, through the Ack Policy field of the QoS Control field of the MAC header, request the wireless communication terminal 1403 to transmit the ACK and specify the format of the ACK. Specifically, the base wireless communication terminal 1401 may request ACK transmission to the wireless communication terminal 1403 and designate the ACK format, as in an embodiment of FIG. 8.

In addition, the base wireless communication terminal 1401 may transmit a BAR frame to the wireless communication terminal 1403 to request immediate transmission of a Block ACK frame. In addition, the base wireless communication terminal 1401 may transmit an MU-BAR frame to the wireless communication terminal 1403 to request immediate transmission of an MU-Block ACK frame.

In the MU cascading transmission, the base wireless communication terminal may request the wireless communication terminal 1403 to transmit an immediate MU-Block ACK frame for data transmission. Specifically, the base wireless communication terminal may request immediate transmission of MU-Block ACK for data transmission to the wireless communication terminal 1403 through the Ack Policy field of the QoS Control field or the MU-BAR frame.

When the base wireless communication terminal 1401 requests the wireless communication terminal 1403 to transmit the MU-Block ACK frame immediately but does not receive the MU-Block ACK frame, the base wireless communication terminal 1401 may transmit the MU-BAR frame to the wireless communication terminal 1403. Specifically, when the base wireless communication terminal 1401 requests the transmission of the MU-Block ACK frame by setting the Ack Policy field of the HT Control field to 1(01b) but fails to receive the MU-Block ACK frame, the base wireless communication terminal 1401 may transmit the MU-BAR frame to the wireless communication terminal 1403. In a specific embodiment, if the base wireless communication terminal 1401 transmits the UL MU response information for transmitting the MU-Block ACK to the wireless communication terminal 1403 and requests the transmission of the MU-Block ACK frame by setting the Ack Policy field of the HT Control field to 1(01b), but fails to receive the MU-Block ACK frame, the base wireless communication terminal 1401 may transmit the MU-BAR frame to the wireless communication terminal 1403. Also, if the base wireless communication terminal 1401 transmits the MU-BAR MPDU for transmitting the MU-Block ACK to the wireless communication terminal 1403, requests the transmission of the MU-Block ACK frame by setting the Ack Policy field of the HT Control field to 1(01b), but fails to receive the MU-Block ACK frame, the base wireless communication terminal 1401 may transmit an MU-BAR frame to one or a plurality of wireless communication terminals. Specifically, the base wireless communication terminal 1401 may operate as in an embodiment described with reference to FIG. 9.

Also, the base wireless communication terminal 1401 and the wireless communication terminal 1403 may request an immediate ACK transmission to the MPDU including information on the operation mode change. Also, the base wireless communication terminal 1401 and the wireless communication terminal 1403 may transmit the MPDU including information on the operation mode change through the SU PPDU. Also, the base wireless communication terminal 1401 and the wireless communication terminal 1403 may transmit the MPDU including the information on the operation mode change through the trigger-based PPDU.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal that wirelessly communicates, the wireless communication terminal comprising:
a transceiver; and
a processor,
wherein the processor is configured to:
receive a Downlink Multi-User (DL MU) physical layer protocol data unit (PPDU) including information for an Uplink Multi-User (UL MU) transmission from a base wireless communication terminal by using the transceiver, and
when the information for the UL MU transmission is UL MU response information, transmit a PPDU for the UL MU transmission without using UL MU-Multi-Input Multi-Output (MIMO),
wherein the UL MU response information includes transmission scheduling information of the PPDU for the UL MU transmission and is included in a medium access control (MAC) header.

2. The wireless communication terminal of claim 1, wherein when the information for the UL MU transmission is the UL MU response information, the processor is configured to transmit the PPDU for the UL MU transmission using a binary convolutional coding (BCC) code.

3. The wireless communication terminal of claim 1, wherein when the information for the UL MU transmission is the UL MU response information, the processor is configured to transmit a packet extension field according to a length indicated by the base wireless communication terminal when the wireless communication terminal transmits the PPDU for the UL MU transmission.

4. The wireless communication terminal of claim 1, wherein when the information for the UL MU transmission is the UL MU response information, an Aggregate-MAC Protocol Data Unit (A-MPDU) including the UL MU response information does not comprise a trigger MPDU that triggers a wireless communication terminal whose UL MU transmission is triggered by the UL MU response information.

5. The wireless communication terminal of claim 1, wherein when the information for the UL MU transmission is a trigger MAC Protocol Data Unit (MPDU) for triggering the UL MU transmission of the wireless communication terminal, wherein an Aggregate-MPDU (A-MPDU) comprising the trigger MPDU comprises a Block ACK MPDU as a first MPDU and comprises a trigger MPDU as a second MPDU.

6. The wireless communication terminal of claim 5, wherein the A-MPDU comprises a Block ACK Request (BAR) MPDU as a last MPDU when the information for the UL MU transmission is the trigger MPDU for triggering the UL MU transmission of the wireless communication terminal.

7. A method of operating a wireless communication terminal that wirelessly communicates, the method comprising:
receiving, from a base wireless communication terminal, a Downlink Multi-User (DL MU) PPDU including information for Uplink Multi-User (UL MU) transmission; and
when the information for the UL MU transmission is UL MU response information, transmitting a PPDU for the UL MU transmission without using UL MU-Multi-Input Multi-Output (MIMO),
wherein the UL MU response information includes transmission scheduling information of the PPDU for the UL MU transmission and is included in a medium access control (MAC) header.

8. The method of claim 7, wherein when the information for the UL MU transmission is the UL MU response information, the transmitting the PPDU for the UL MU transmission comprises transmitting the PPDU for the UL MU transmission using a binary convolutional coding (BCC) code.

9. The method of claim 7, wherein when the information for the UL MU transmission is the UL MU response information, the transmitting the PPDU for the UL MU transmission comprises transmitting a packet extension field according to a length indicated by the base wireless communication terminal.

10. The method of claim 7, wherein when the information for the UL MU transmission is the UL MU response information, an Aggregate-MAC Protocol Data Unit (A-MPDU) including the UL MU response information does not comprise a trigger MPDU that triggers a wireless communication terminal whose UL MU transmission is triggered by the UL MU response information.

11. The method of claim 7, wherein when the information for the UL MU transmission is a trigger MAC Protocol Data Unit (MPDU) for triggering the UL MU transmission of the wireless communication terminal, the Aggregate-MPDU (A-MPDU) comprising the trigger MPDU comprises a Block ACK MPDU as a first MPDU and comprises a trigger MPDU as a second MPDU.

12. The method of claim 11, wherein the A-MPDU comprises a Block ACK Request (BAR) MPDU as a last MPDU when the information for the UL MU transmission is the trigger MPDU for triggering the UL MU transmission of the wireless communication terminal.

* * * * *